United States Patent
Decurninge et al.

(10) Patent No.: US 12,342,385 B2
(45) Date of Patent: Jun. 24, 2025

(54) TRANSMITTING DEVICE, RECEIVING DEVICE, AND METHODS FOR RANDOM-ACCESS COMMUNICATION

(71) Applicant: HUAWEI TECHNOLOGIES CO., LTD., Guangdong (CN)

(72) Inventors: Alexis Decurninge, Boulogne Billancourt (FR); Maxime Guillaud, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/899,243

(22) Filed: Aug. 30, 2022

(65) Prior Publication Data
US 2022/0418008 A1 Dec. 29, 2022

Related U.S. Application Data

(63) Continuation of application No. PCT/EP2020/055894, filed on Mar. 5, 2020.

(51) Int. Cl.
*H04W 4/00* (2018.01)
*H04W 74/0833* (2024.01)

(52) U.S. Cl.
CPC .............................. *H04W 74/0833* (2013.01)

(58) Field of Classification Search
CPC ..... H04W 74/0833; H04L 1/00; H04L 27/345
See application file for complete search history.

(56) References Cited

U.S. PATENT DOCUMENTS

| | | | |
|---|---|---|---|
| 11,575,467 B2* | 2/2023 | Ye | H04L 1/0071 |
| 2009/0282311 A1* | 11/2009 | Lee | H04L 1/1819 |
| | | | 714/751 |
| 2014/0269960 A1* | 9/2014 | Petrov | H04L 27/3444 |
| | | | 375/296 |
| 2017/0295037 A1* | 10/2017 | Mejri | H04L 25/03292 |
| 2020/0186284 A1* | 6/2020 | Noh | H04L 1/00 |
| 2021/0297300 A1* | 9/2021 | Zhang | H04L 27/2626 |
| 2021/0306005 A1* | 9/2021 | Sheiman | H03M 13/13 |

FOREIGN PATENT DOCUMENTS

WO 2018231026 A1 12/2018

OTHER PUBLICATIONS

Comon, "Tensors: A Brief Introduction," IEEE Signal Processing Magazine, Jul. 31, 2014, 11 pages.
(Continued)

*Primary Examiner* — Abdelnabi O Musa
(74) *Attorney, Agent, or Firm* — Fish & Richardson P.C.

(57) ABSTRACT

A transmitting device for a random-access communication, includes an encoder that acquires an input message having a sequence of bits. The encoder is configured to form a plurality of blocks from the sequence of bits, and determine a plurality of vectors for the plurality of blocks. The transmitting device further includes a mapper circuit that is configured to construct a symbol vector based on the plurality of vectors. The transmitting device further includes an antenna that is configured to transmit the constructed symbol vector over a radio frequency (RF) signal to a receiving device, where the constructed symbol vector represents a symbol modulated in the radio frequency signal.

20 Claims, 18 Drawing Sheets

(56) References Cited

OTHER PUBLICATIONS

Conway et al., "Packing Lines, Planes, etc.: Packings in Grassmannian Spaces,". Experimental Mathematics, vol. 5, No. 2, Apr. 12, 1996, 36 pages.
Fengler et al., "Massive MIMO Unsourced Random Access," arXiv preprint, arXiv:1901.00828v1 [cs.IT], Jan. 3, 2019, 8 pages.
Fengler et al., "SPARCs for Unsourced Random Access," arXiv preprint, arXiv:1901.06234v3 [cs.IT], Dec. 9, 2021, 23 pages.
Ngo et al., "A Multiple Access Scheme for Non-Coherent SIMO Communications," 2018 52nd Asilomar Conference on Signals, Systems, and Computers, Feb. 21, 2019, 5 pages.
Ngo et al., "Design and Analysis of a Practical Codebook for Non-Coherent Communications," 2017 51st Asilomar Conference on Signals, Systems, and Computers, Apr. 16, 2018, 5 pages.
PCT International Search Report and Written Opinion issued in International Application No. PCT/EP2020/055894 on Dec. 3, 2020, 14 pages.
Polyanskiy, "A Perspective on Massive Random-Access," 2017 IEEE International Symposium on Information Theory (ISIT), Aug. 14, 2017, 5 pages.
Wu et al., "Three-Dimensional Combined Diversity Coding and Error Control Coding: Code Design and Diversity Analysis," 2011 11th International Symposium on Communications and Information Technologies (ISCIT), Dec. 1, 2011, 6 pages.
Zhang et al., "Reed-Muller Sequences for 5G Grant-Free Massive Access," 2017 IEEE Global Communications Conference (GLOBECOM 2017), Jan. 15, 2018, 7 pages.

\* cited by examiner

TRANSMITTING DEVICE, RECEIVING DEVICE, AND METHODS FOR RANDOM-ACCESS COMMUNICATION

CROSS-REFERENCE TO RELATED APPLICATIONS

This application is a continuation of International Application No. PCT/EP2020/055894, filed on Mar. 5, 2020, the disclosure of which is hereby incorporated by reference in its entirety.

TECHNICAL FIELD

The present disclosure relates generally to the field of wireless communication; and more specifically, to a transmitting device, a receiving device, and methods for random-access communication.

BACKGROUND

With the rapid increase in the number of communication devices in a network, concerns about communication reliability have become prominent. Traditionally, fixed access methods are used by conventional communication devices for communication of data in a network. In the fixed access methods, a given communication device is assigned either a fixed time slot or a fixed frequency to send data via a communication channel. The conventional fixed access methods are less efficient in terms of channel utilization because sometimes the given communication device may not have any data to transmit in the fixed time slot or in the fixed frequency.

In certain scenarios, instead of the conventional fixed access methods, conventional random-access methods are used for a comparatively better utilization of the communication channel. In the random-access methods, a conventional communication device (e.g. a transmitter) is allowed to send data on the communication channel whenever it has some data to transmit. There is no need of a preassigned time slot or a fixed frequency for data transmission. The conventional random-access methods are typically classified into coherent and non-coherent methods. In coherent methods, the channel state is known to communication devices (i.e. both the transmitter and the receiver). In the conventional coherent methods, the transmitted data typically consists of two parts namely a pilot part and a data part. The pilot part is used at the conventional receiver for channel estimation and other operations related to processing of the data part, whereas the data part is used to carry information. In non-coherent methods, the channel state is supposed to be unknown to both the conventional transmitter and the conventional receiver. The traditional non-coherent methods use sparsity for extracting information from the transmitted data. Thus, the conventional random-access methods require additional parameters (e.g. the coherent methods require the pilot part and the non-coherent methods use sparsity in transmitted data), which increases the complexity at both the transmitter side and the receiver side. Moreover, the probability of decoding error is increased resulting in erroneous (or unreliable) recovery of data at the conventional receiver. Thus, there is a technical problem of inefficient waveform design and inadequate communication reliability in the conventional random-access methods.

Therefore, in light of the foregoing discussion, there exists a need to overcome the aforementioned drawbacks associated with conventional communication devices and methods for random-access communication.

SUMMARY

The present disclosure seeks to provide a transmitting device, a receiving device, and methods for random-access communication. The present disclosure seeks to provide a solution to the existing problem of inefficient waveform design and inadequate communication reliability in conventional random-access communication methods. An aim of the present disclosure is to provide a solution that overcomes at least partially the problems encountered in prior art, and provides an improved transmitting device, receiving device and methods that provides an efficient waveform design and adequate communication reliability even in massive random-access communication scenarios.

The object of the present disclosure is achieved by the solutions provided in the enclosed independent claims. Advantageous implementations of the present disclosure are further defined in the dependent claims.

In a first aspect, the present disclosure provides a transmitting device for a random-access communication. The transmitting device comprises of an encoder that is configured to acquire an input message having a sequence of bits. The encoder is further configured to form a plurality of blocks from the sequence of bits. The encoder is further configured to determine a plurality of vectors for the plurality of blocks. The transmitting device further comprises of a mapper circuit that is configured to construct a symbol vector based on the plurality of vectors. The transmitting device further comprises of an antenna that is configured to transmit the constructed symbol vector over a radio frequency (RF) signal to a receiving device, wherein the constructed symbol vector represents a symbol modulated in the radio frequency signal.

The transmitting device enables an improved waveform design for the random-access communication. The waveform design corresponds to the radio frequency signal that carries at least the constructed symbol vector. The encoder is a low-complexity binary encoder that efficiently encodes the input message. The use of the symbol vector enables the transmitting device to outperform the conventional methods for random access in terms of number of supported users and probability of decoding error. Moreover, the transmitting device allows a grant-free communication (i.e. the transmitting device does not require any prior request from the receiving device for data transmission). Additionally, the transmitting device does not require a preassigned time slot or a preassigned frequency for data transmission, and the random-access communication occurs even when a channel state information is unknown to the transmitting device as well as the receiving device.

In a first implementation form of the first aspect, the symbol vector is constructed based on at least one Kronecker product of the plurality of vectors.

The use of the Kronecker product to construct the symbol vector improves various performance metrics as compared to conventional random-access communication. For example, the number of supportable users and the communication reliability is significantly increased. Due to the definite structure of the symbol vector, the probability of decoding error is reduced at the receiving device, which improves the communication reliability. The use of the Kronecker product to construct the symbol vector results in an efficient waveform design, which increases the channel capacity to adequately handle massive random-access scenarios and simplifies the encoding and the decoding process.

In a second implementation form of the first aspect, the encoder is further configured to encode the sequence of bits by use of a channel code that adds redundancy to the sequence of bits to obtain a sequence of coded bits. The plurality of blocks are formed from the sequence of coded bits when the sequence of bits are encoded by the channel code.

The channel code, for example, a polar code, a turbo code, a low-density parity check (LDPC) code, a hamming code, or a cyclic redundancy check (CRC) code, is employed on the sequence of bits of the input message to incorporate redundancy and reduce the probability of decoding error at the receiving device. The probability of decoding error is computed in terms of the detection and correction of bit errors at the receiving device.

In a third implementation form of the first aspect, the plurality of vectors correspond to a plurality of sub-constellations and the symbol vector corresponds to a constellation. The constellation is a cartesian product of the plurality of sub-constellations. A product of a vector size of each of the plurality of vectors is equal to a number of channel uses.

The plurality of sub-constellations has different dimensions. The cartesian product of the plurality of sub-constellations converge the different dimensions associated with the plurality of sub-constellations into a definite structure of the constellation (i.e. the symbol vector). As a result of the definite structure of the symbol vector, the waveform design for the random-access communication is simplified and the probability of decoding error is reduced at the receiving device, which improves the communication reliability.

In a fourth implementation form of the first aspect, each of the plurality of sub-constellations has a structure selected from at least one of: a Grassmannian constellation, a cube-split constellation, a canonical basis, a single-element codebook or a constellation wherein each of the plurality of vectors is divided to a pilot part and a data part.

Each of the plurality of sub-constellations has a defined structure and each structure has its own characteristics such as the structured Grassmannian constellation (e.g. a cube-split constellation) provides a dense constellation structure. The dense constellation structure (e.g. of the symbol vector) based on the structured Grassmannian constellation results in a compact form of input data and promotes a low complexity decoding process at the receiving device. The canonical basis constellation structure simplifies the process of separation of one or more transmitting devices concurrently at the receiving device. The constant constellation structure (e.g. a single-element codebook) improves the signal quality at the receiving device. The signal quality is computed in terms of signal-to-noise ratio of the signal at the receiving device.

In a fifth implementation form of the first aspect, the symbol vector has at least one of a rank 1 tensor structure, a rank-n tensor structure or a rank-K tensor structure, and wherein the mapper circuit is further configured to determine a one-to-one correspondence between each element of the tensor structure of the symbol vector having two or more modes and a corresponding signal frequency in order to modulate the symbol vector in the radio frequency signal.

The imposing of the tensor structure on the symbol vector enables a reliable user separation at the receiving device. The one-to-one correspondence between each element of the tensor structure of the symbol vector into corresponding signal frequency further simplifies the waveform design of the radio frequency signal.

In a second aspect, the present disclosure provides a receiving device for a random-access communication. The receiving device comprises at least one antenna configured to receive a plurality of radio frequency signals concurrently from a plurality of transmitting devices. The receiving device further comprises of an equalizer circuit that is configured to estimate a plurality of symbol vectors from the received plurality of radio frequency signals in digital domain, and segregate the plurality of symbol vectors. The receiving device further comprises a plurality of decoders, where each decoder is configured to decode one segregated symbol vector of the estimated plurality of symbol vectors to obtain a plurality of decoded messages. Each decoded message has a sequence of bits that corresponds to data associated with a corresponding transmitting device of the plurality of transmitting devices.

The receiving device enables to receive the plurality of radio frequency signals concurrently from the plurality of transmitting devices, even when the number of antennas at the receiving device is less than the number of transmitting devices (i.e. capable to handle massive random-access scenarios). The receiving device is able to estimate the transmitting devices which are active at a time. The receiving device does not need to know in advance neither the number nor the identity of the transmitting devices that are transmitting over-the-air (OTA). Moreover, the receiving device does not require a pilot part to estimate channel information, thereby providing a low-complexity decoding process. The receiving device is able to recover a list of original sequence of bits (i.e. decoded messages) of all transmitting devices from the received symbols (i.e. plurality of symbol vectors) efficiently and accurately even if there is an uncertainty about the transmitting users' identity (i.e. identity of the transmitting devices).

In a first implementation form of the second aspect, the equalizer circuit is a non-coherent equalizer in which a channel state information is unknown when the plurality of symbol vectors is estimated.

The equalizer circuit of the receiving device does not require a pilot part of the symbol vector to estimate the channel state information. In this way, it reduces the computational complexity at the receiving device.

In a second implementation form of the second aspect, the equalizer circuit is configured to execute a first type of decoding in which the equalizer circuit is configured to utilize a first parameter that represents a maximum possible number of the plurality of decoded messages to estimate a number of active transmitting devices. The equalizer circuit is further configured to execute the first type of decoding based on a maximum likelihood decoding or a canonical polyadic decomposition.

The first type of decoding is a low-complexity decoding, which enables to accurately estimate the number of active transmitting devices, even if the number and the identity of the transmitting devices that are transmitting over-the-air is not known in advance. By use of the maximum likelihood decoding or the canonical polyadic decomposition, the receiving device is able to recover a list of original sequence of bits (i.e. decoded messages) of all transmitting devices efficiently and accurately even if there is an uncertainty about the transmitting users' identity (i.e. identity of the transmitting devices). Moreover, the uniqueness of the canonical polyadic decomposition provides a user separation capability (i.e. separation of received signal into its single-user components.

In a third implementation form of the second aspect, the equalizer circuit is further configured to utilize a second parameter that represents a power threshold. The power threshold is used to discard a subset of the estimated plurality of symbol vectors.

The power threshold enables to discard a subset of the estimated plurality of symbol vectors, which increases the accuracy related to estimation of the number of active transmitting devices.

In a fourth implementation form of the second aspect, the at least one decoder of the plurality of decoders is further configured to execute a de-mapping of each vector of the plurality of vectors associated with the first segregated symbol vector to obtain a plurality of part messages.

The de-mapping of each vector of the plurality of vectors results separately by each decoder (e.g. a single-user decoder) not only increases the speed of decoding but also contributes in reducing the probability of decoding error to recover the decoded messages.

In a fifth implementation form of the second aspect, the at least one decoder of the plurality of decoders is further configured to concatenate the plurality of part messages to re-construct a message having a sequence of bits.

The reconstructed messages correspond to the original messages transmitted by each transmitting device of the plurality of transmitting devices. The use of the Kronecker product to construct symbol vector that is used in signal construction (i.e. waveform design) not only reduces computational complexity at the transmitter side but also at the receiver side. For example, the probability of decoding error is reduced at the receiving device, resulting in accurate re-construction of the message, thereby improving the communication reliability.

In a sixth implementation form of the second aspect, the at least one decoder of the plurality of decoders is further configured to concatenate the plurality of part messages to obtain a sequence of coded bits. The at least one decoder is further configured to decode the sequence of coded bits by use of an inverse channel code that removes redundancy from the sequence of coded bits to re-construct a message having a sequence of bits, where the inverse channel code is applied when a channel coding is detected on the sequence of coded bits.

Each decoder of the plurality of decoders is able to detect whether channel coding is applied or not, and accordingly a suitable inverse channel code is applied to accurately re-construct the message.

In a seventh implementation form of the second aspect, the equalizer circuit is configured to execute a second type of decoding in which the equalizer circuit is configured to compute a posterior distribution of each symbol vector of the plurality of symbol vectors based on prior information of a total number of the estimated plurality of symbol vectors.

The receiving device provides a flexibility to select between the first type of decoding (e.g. hard decoding) or the second type of decoding (e.g. soft decoding). On the basis of the posterior probability distribution, each of the plurality of decoders is able to compute a plurality of bit probabilities for every bit position of estimated bits (e.g. estimated bits of each decoded message) in a low-complexity manner.

In a third aspect, the present disclosure provides a method for a random-access communication. The method comprises acquiring, by an encoder of a transmitting device, an input message having a sequence of bits. The method further comprises forming, by the encoder of the transmitting device, a plurality of blocks from the sequence of bits. The method further comprises determining, by the encoder of the transmitting device, a plurality of vectors for the plurality of blocks. The method further comprises constructing, by the transmitting device, a symbol vector based on the plurality of vectors. The method further comprises transmitting, by the transmitting device, the constructed symbol vector over a radio frequency (RF) signal to a receiving device, where the constructed symbol vector represents a symbol modulated in the radio frequency signal.

In further implementation forms of the method of the third aspect, the method performs the features of the implementation forms of the transmitting device according to the first aspect. Hence, implementation forms of the method comprise the feature(s) of the corresponding implementation form of the transmitting device of the first aspect.

The method of the third aspect achieves all the advantages and effects of the transmitting device of the first aspect.

In a fourth aspect, the present disclosure provides a method for a random-access communication. The method comprises receiving, by a receiving device, a plurality of radio frequency signals concurrently from a plurality of transmitting devices. The method further comprises estimating, by the receiving device, a plurality of symbol vectors from the received plurality of radio frequency signals in digital domain, and segregating the plurality of symbol vectors. The method further comprises decoding, by the receiving device, each segregated symbol vector of the estimated plurality of symbol vectors to obtain a plurality of decoded messages, where each decoded message has a sequence of bits that corresponds to data associated with a corresponding transmitting device of the plurality of transmitting devices.

In further implementation forms of the method of the fourth aspect, the method performs the features of the implementation forms of the receiving device according to the second aspect. Hence, implementation forms of the method comprise the feature(s) of the corresponding implementation form of the receiving device of the second aspect.

The method of the fourth aspect achieves all the advantages and effects of the receiving device of the second aspect.

In a fifth aspect, the present disclosure provides a computer program product comprising a non-transitory computer-readable storage medium having computer program code stored thereon, the computer program code being executable by a processor to execute the method of the third or fourth aspect.

The computer program product of the fifth aspect achieves all the advantages and effects of the transmitting device of the first aspect or the receiving device of the second aspect.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
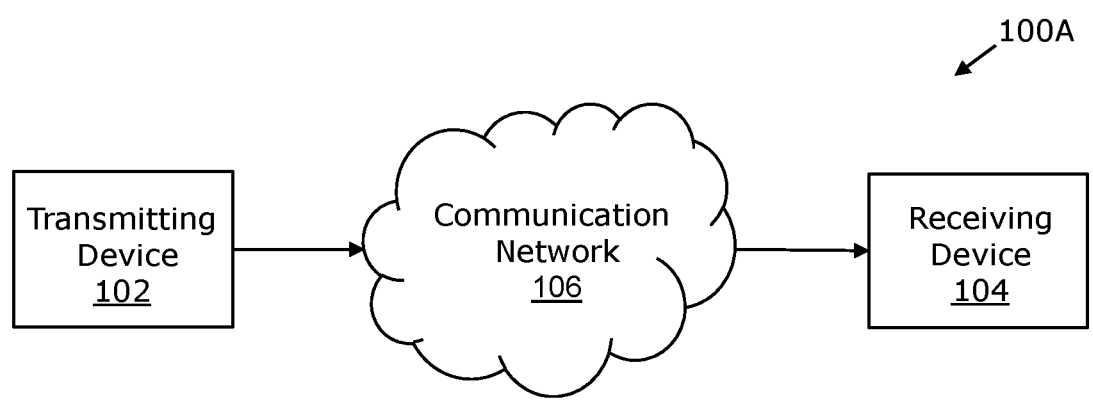
FIG. 1A is a network environment diagram of a system with a transmitting device and a receiving device, in accordance with an embodiment of the present disclosure.

FIG. 1A is a network environment diagram of a system 100A with a transmitting device and a receiving device, in accordance with an embodiment of the present disclosure. With reference to FIG. 1A, there is shown a network environment of the system 100A that includes a transmitting device 102 and a receiving device 104. There is further shown a communication network 106.

The transmitting device 102 includes suitable logic, circuitry, interfaces and/or code that is configured to communicate with the receiving device 104 via the communication network 106 (e.g. a propagation channel). Examples of the transmitting device 102 includes, but is not limited to an Internet-of-Things (IoT) device, a smart phone, a machine type communication (MTC) device, a computing device, an evolved universal mobile telecommunications system (UMTS) terrestrial radio access (E-UTRAN) NR-dual connectivity (EN-DC) device, a server, an IoT controller, a drone, a customized hardware for wireless telecommunication, a transmitter, or any other portable or non-portable electronic device.

The receiving device 104 includes suitable logic, circuitry, interfaces and/or code that is configured to receive one or more radio frequency signals from the transmitting device 102, via the communication network 106 (e.g. via a propagation channel). In an implementation, the receiving device 104 is configured to receive a plurality of radio frequency signals concurrently from a plurality of transmitting devices, such as the transmitting device 102. Examples of the receiving device 104 includes, but is not limited to an Internet-of-Things (IoT) controller, a base station, a server, a smart phone, a customized hardware for wireless telecommunication, a receiver, or any other portable or non-portable electronic device.

The communication network 106 includes a medium (e.g. a communication channel) through which one or more transmitting devices, such as the transmitting device 102, potentially communicates with the receiving device 104. Examples of the communication network 106 include, but are not limited to, a cellular network (e.g. a 2G, a 3G, long-term evolution (LTE) 4G, a 5G, or 5G NR network, such as sub 6 GHz, cmWave, or mmWave communication network), a wireless sensor network (WSN), a cloud network, a Local Area Network (LAN), a vehicle-to-network (V2N) network, a Metropolitan Area Network (MAN), and/or the Internet. The transmitting device 102 in the network environment is configured to connect to the receiving device 104, in accordance with various wireless communication protocols. Examples of such wireless communication protocols, communication standards, and technologies may include, but are not limited to, IEEE 802.11, 802.11p, 802.15, 802.16, 1609, Worldwide Interoperability for Microwave Access (Wi-MAX), Transmission Control Protocol and Internet Protocol (TCP/IP), User Datagram Protocol (UDP), Hypertext Transfer Protocol (HTTP), Long-term Evolution (LTE), File Transfer Protocol (FTP), Enhanced Data GSM Environment (EDGE), Voice over Internet Protocol (VoIP), a protocol for email, instant messaging, and/or Short Message Service (SMS), and/or other cellular or IoT communication protocols.

In operation, the transmitting device 102 is configured to acquire an input message having a sequence of bits. The input message refers to user data that is to be transmitted to the receiving device 104. In an example, the transmitting device 102 may be an IoT device. In such a case, the input message is potentially sensor data sensed by the IoT device. In another example, transmitting device 102 may be a smart phone, where the input message is potentially user data that is to be transmitted to the receiving device 104.

The transmitting device 102 is further configured to form a plurality of blocks from the sequence of bits. The plurality of blocks is formed from the sequence of bits of the input message. Typically, "d" number of blocks is formed, where "d" is an arbitrary number. In an example, the input message m has a sequence of 7 bits (e.g. m=1000110). In this case, "d" is equal to three (i.e. three blocks are formed) from the sequence of bits of the input message. An example of the plurality of blocks formed from the sequence of bits, is described in detail, for example, in FIG. 3A. In an implementation, the plurality of blocks are formed based on splitting the sequence of bits of the input message. For example, the sequence of B bits of the input message m may split into the plurality of blocks such as 1, . . . , d blocks. Each block of the plurality of blocks corresponds to $m_i, \ldots, m_d$ blocks (where i=1, . . . , d) of the input message m. Each block of the plurality of blocks $m_i, \ldots, m_d$ has a subsequence of bits of the input message that corresponds to $B_i, \ldots, B_d$ subsequence. The sum of bits of the subsequence $B_i, \ldots, B_d$ is equal to the B bits of the input message m. i.e. $B=\Sigma_{i=1}^{d} B_i$. In another implementation, the plurality of blocks is formed based on duplicating the sequence of bits of the input message, for example, to increase reliability of communication.

The transmitting device 102 is further configured to determine a plurality of vectors for the plurality of blocks. A vector of dimension n (i.e. vector size n) is an ordered arrangement of n elements. The plurality of vectors formed from the plurality of blocks i.e. $m_1, \ldots, m_d$ corresponds to $x_{k,1}, \ldots, x_{k,d}$ vectors. In an example, $x_{k,1}$ corresponds to a vector x related to a $k^{th}$ transmitting device and a first block (i.e. $m_1$) of the plurality of blocks. The $k^{th}$ transmitting device corresponds to the transmitting device 102. Thus, the plurality of vectors i.e. $x_{k,1}, \ldots, x_{k,d}$ includes information corresponding to $m_1, \ldots, m_d$ blocks. The vector $x_{k,1}$ has a vector size of $T_1$ (vector size is also referred as a dimension). Similarly, the plurality of vectors $x_{k,1}, \ldots, x_{k,d}$ has the vector size of $T_1, \ldots, T_d$ respectively. A product of the vector size of each of the plurality of vectors is equal to a number of channel uses.

The transmitting device 102 is further configured to construct a symbol vector based on the plurality of vectors. The symbol vector is a multi-dimensional data structure. The symbol vector carries the information of the input message. The plurality of vectors $x_{k,1}, \ldots, x_{k,d}$ together are used to construct the symbol vector $s_k$. The symbol vector $s_k$ is a vector of dimensions T. The construction of the symbol vector is described in detail, for example, in FIGS. 2B, 3A, and 5.

In accordance with an embodiment, the symbol vector is constructed based on at least one Kronecker product of the plurality of vectors. The symbol vector carries the same information as the sequence of the bits of the input message m. The Kronecker product is a form of matrix multiplication and is represented by a mathematical notation ⊗. The Kronecker product is also known as a tensor product (or a direct product). The use of Kronecker product is beneficial as the dimensions of a plurality of matrices being multiplied together on the basis of the Kronecker product do not need to have any relation with each other. The symbol vector $s_k$ is constructed from the plurality of vectors $x_{k,1}, \ldots, x_{k,d}$ on the basis of the Kronecker product is denoted by the following mathematical expression (equation 1).

$$s_k = x_{k,1} \otimes \ldots \otimes x_{k,d} \tag{1}$$

In accordance with an embodiment, the plurality of vectors corresponds to a plurality of sub-constellations and the symbol vector corresponds to a constellation, where the constellation is a cartesian product of the plurality of sub-constellations. The constellation has a definite and a fixed multi-dimensional data structure, which reduces the computational complexity for waveform design for data transmission. The plurality of sub-constellations belongs to the same constellation and has two or more dimensions. The plurality of sub-constellations corresponds to the plurality of vectors $x_{k,1}, \ldots, x_{k,d}$ and are denoted as $C_i, \ldots, C_d$. For example, $C_i$ corresponds to the vector $x_{k,i}$ with the vector size of $T_i$. The elements of the sub-constellation $C_i$ is denoted as $C_i = \{c_{1,i}, \ldots, c_{2^{B_{i,i}}}\}$. The elements of the constellation C is denoted by $C = \{c_1, \ldots, c_{2^B}\}$. The number of elements in the constellation C is equal to $2^B$ elements, where $B = \Sigma_{i=1}^{d} B_i$. The plurality of sub-constellations $C_1, \ldots, C_d$ has the vector size of $T_1, \ldots, T_d$, respectively. The vector size T of the constellation C is equal to the product of the vector size of each of the plurality of vectors i.e. $\Pi_{i=1}^{d} T_i = T$. Thus, the vector size T of the constellation C is equal to the number of channel uses.

In accordance with an embodiment, each of the plurality of sub-constellations has a structure selected from at least one of: a Grassmannian constellation, a cube-split constellation, a canonical basis, a single-element codebook or a constellation wherein each of the plurality of vectors is divided to a pilot part and a data part. In an example, the structure of the plurality of sub-constellations is based on a structured Grassmannian constellation (e.g. a cube-split constellation). In another example, the structure of the plurality of sub-constellations is based on the canonical basis constellation. The canonical basis constellation has the structure denoted as $C=\{(1, 0, \ldots, 0)^T, (0, 1, 0, \ldots, 0)^T, \ldots, (0, \ldots, 0, 1)^T\}$. In this case, each of the plurality of blocks satisfies the condition i.e. $B_i=\log_2(T_i)$. Moreover, in a case where the structure of the plurality of sub-constellations is based on the single-element codebook, each of the plurality of blocks satisfies the condition i.e. $B_i=0$.

In accordance with an embodiment, the symbol vector has at least one of a rank 1 tensor structure, a rank-n tensor structure or a rank-K tensor structure. The transmitting device 102 is further configured to determine a one-to-one correspondence between each element of the tensor structure of the symbol vector having two or more modes and a corresponding signal frequency in order to modulate the symbol vector in a radio frequency signal. The use of the Kronecker product is advantageous as it results in a definite and fixed tensor structure of the symbol vector (i.e. a definite multi-dimensional data structure). The tensor structure with "d" modes (which can be construed as a d-dimensional array of real or complex numbers) is considered. The d-dimensional array of real or complex numbers is of respective dimensions $T_1 \ldots T_d$ (which can be denoted as "a tensor of order "d" and size "$T_1 \times \ldots \times T_d$"). The $T=\Pi_{i=1}^{d} T_i$ numbers contained in the tensor structure can also be stored sequentially (in a predefined order) in a vector of size $T=\Pi d_{i=1}^{d} T_i$. The vectorization to tensorization operation and vice-versa is further described, for example, in FIG. 2C. Any tensor structure that can be potentially denoted as $\mathcal{T}(x_1 \otimes \ldots \otimes x_d)$, where "$x_1 \ldots x_d$" refers to vectors with respective dimensions $T_1 \ldots T_d$ is usually called a rank-1 tensor structure. In a case where a tensor structure can be denoted as a sum of at least n rank-1 tensors, it is potentially deemed as a rank-n tensor. Alternatively, optionally, "n" variable represents a first arbitrary number, and the "K" variable represents a second arbitrary number, which is potentially different from the first arbitrary number. The one-to-one correspondence between each element of the tensor structure of the symbol vector into corresponding signal frequency simplifies the waveform design of the radio frequency signal. Moreover, in case of multiple transmitting devices transmitting such radio frequency signals, the execution of a sum operation on two or more tensor structures of a same size in order to recover the original input data at the receiving device 104, is simplified.

The transmitting device 102 is further configured to transmit the constructed symbol vector over the radio frequency signal to a receiving device. The constructed symbol vector represents a symbol modulated in the radio frequency signal. The radio frequency signal refers to an electromagnetic wave used to transmit the encoded input message in the form of the symbol vector over the air. Each element of the tensor structure of the symbol vector is linearly mapped to a corresponding signal frequency in order to modulate the symbol vector in the radio frequency signal (e.g. a carrier wave), which is transmitted to the receiving device 104.

In an implementation, optionally, instead of directly forming the plurality of blocks from the sequence of bits of the input message, the transmitting device 102 is configured to encode the sequence of bits by use of a channel code that adds redundancy to the sequence of bits to obtain a sequence of coded bits. In this case, the plurality of blocks are formed from the sequence of coded bits (instead of sequence of uncoded bits) when the sequence of bits are encoded by the channel code. The channel code is also known as error correcting code or error detecting code. Examples of the channel code include, but not limited to a polar code, a turbo code, a Low-Density Parity Check (LDPC) code, a Hamming code, a Reed-Solomon code, or a Cyclic Redundancy Check (CRC) code. The channel code is applied on the sequence of bits of the input message to obtain the sequences of coded bits. In an example, the channel code is applied on an input message i.e. $m_k$ to obtain a coded input message i.e. $m'_k$. The use of channel codes depends on an application (i.e. a use case). In a case where the channel code is used, then the sequence of coded bits is different from the sequence of bits of the input message. The encoding of the sequence of bits by use of the channel code, is further described, for example, in FIGS. 3B and 5.

The receiving device 104 is configured to receive the radio frequency signal from the transmitting device 102, via the communication network 106. Firstly, the receiving device 104 is further configured to perform pre-processing operations to generate an output signal (i.e. a received signal y) in digital domain from the received radio frequency signal. For example, the pre-processing operations includes demodulation of the received radio frequency signal, conversion of the received radio frequency signal from analog domain to digital domain, followed by symbol synchronization and slicing. In the pre-processing operations, the synchronization in time and frequency of the receiving device 104 is executed with the transmitted symbol to be able to slice the T channel uses (e.g. in the time-frequency grid) in order to output all elements of the output signal (i.e. the received signal y). The output signal is a vectorized form of a matrix data structure that represents collective information from the received radio frequency signal(s). An example of the pre-processing operations, is further described in detail, for example, in FIG. 4B. The output signal (i.e. the received signal y) is then processed to recover the original input message. An example of the processing pipeline to recover the original input message (i.e. a decoded transmitted message) post pre-processing operations, is further described in detail, for example, in FIGS. 1B, 4C, 4D, 6A, and 6B.

Figure 1B:
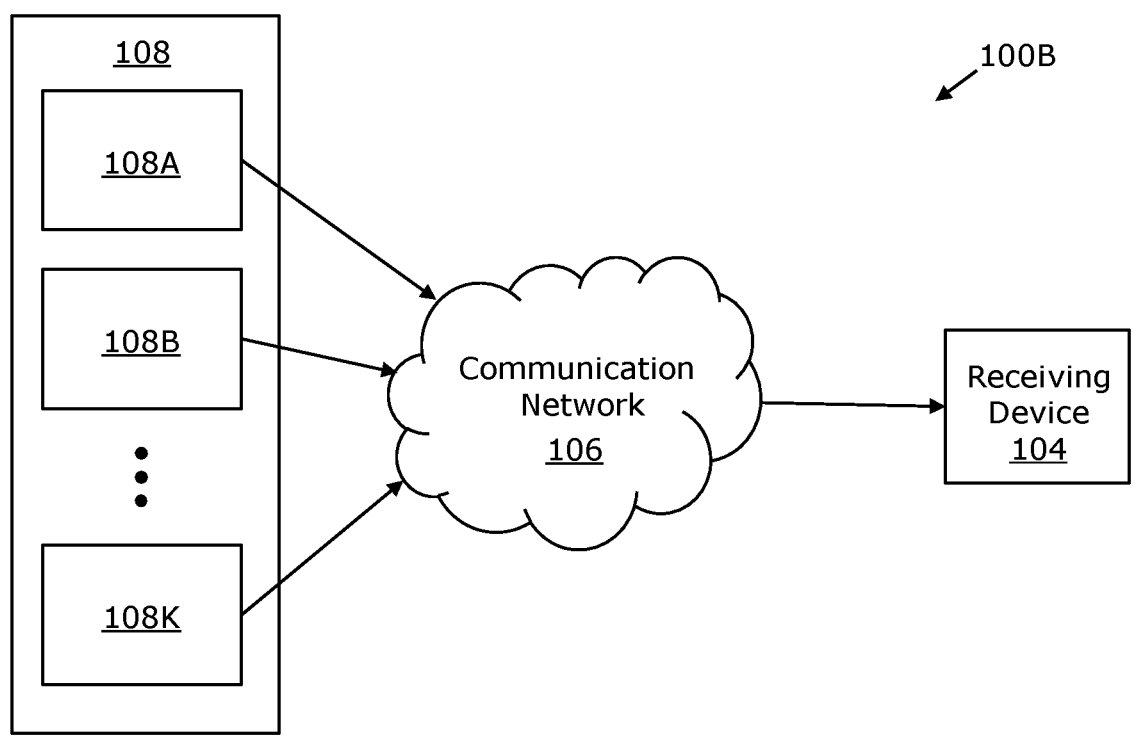
FIG. 1B is a network environment diagram of a system with a plurality of transmitting devices and a receiving device, in accordance with an embodiment of the present disclosure.

FIG. 1B is a network environment diagram of a system 100B with a plurality of transmitting devices and a receiving device, in accordance with an embodiment of the present disclosure. FIG. 1B is described in conjunction with elements from FIG. 1A. With reference to FIG. 1B, there is shown a network environment of the system 100B that includes a plurality of transmitting devices 108 and the receiving device 104 (of FIG. 1A). There is further shown the communication network 106.

Each of the plurality of transmitting devices 108 include suitable logic, circuitry, interfaces and/or code that is configured to communicate with the receiving device 104 via the communication network 106. The plurality of transmitting devices 108 includes a first transmitting device 108A, a second transmitting device 108B, and up to a K-th transmitting device 108K. Each of the plurality of transmitting devices 108 is similar to that of the transmitting device 102.

In operation, the first transmitting device 108A of the plurality of transmitting devices 108 is configured to acquire a first input message (i.e. $m_1$) having a sequence of bits (i.e. $b_{1,1}, \ldots, b_{B,1}$), where $b_{1,1}$ represents a first bit and $b_{B,1}$ represents a $B^{th}$ bit of the sequence of bits of the first transmitting device 108A. The first transmitting device 108A is further configured to form a plurality of blocks from the sequence of bits. The first transmitting device 108A is further configured to determine a plurality of vectors for the plurality of blocks. The first transmitting device 108A is further configured to construct a symbol vector (i.e. $s_1$) based on the plurality of vectors. The symbol vector is constructed from the plurality of vectors on the basis of at least one Kronecker product of the plurality of vectors. Similarly, the second transmitting device 108B of the plurality of transmitting devices 108 is configured to encode a second input message (i.e. $m_2$) having a sequence of bits (i.e. $b_{1,2}, \ldots, b_{B,2}$) and construct a symbol vector (i.e. $s_2$). Similarly, the K-th transmitting device 108K of the plurality of transmitting devices 108 is configured to encode a K-th input message (i.e. $m_K$) having a sequence of bits (i.e. $b_{1,K}, \ldots, b_{B,K}$), and construct a symbol vector (i.e. $s_K$). Each of the plurality of transmitting devices 108 is configured to transmit its constructed symbol vector over a corresponding radio frequency signal to the receiving device 104, via the communication network 106.

The receiving device 104 is configured to receive a plurality of radio frequency signals concurrently from the plurality of transmitting devices 108. The plurality of radio frequency signals are received via the communication network 106. In an implementation, the plurality of radio frequency signals are concurrently received from the plurality of transmitting devices 108 by at least one antenna of the receiving device 104. Beneficially, the receiving device 104 is able to concurrently receive a first number of signals by use of a number of antennas at the receiving device 104 that is less than the first number of signals. Moreover, the receiving device 104 does not need to know in advance neither the number nor the identity of the plurality of transmitting devices 108 that are transmitting over-the-air (OTA).

In accordance with an embodiment, the receiving device 104 is configured to execute pre-processing operations to generate an output signal (e.g. a received vector y) in digital domain from the received plurality of radio frequency signals. The pre-processing operations at the receiving device 104 include demodulation of each of the received plurality of radio frequency signals, conversion of the demodulated signals in analog domain to a digital domain, followed by resource demapping, in which symbol synchronization and slicing is performed to generate a first received signal (i.e. a matrix Y). The first received signal (i.e. the matrix Y) has a matrix data structure that represents collective (or consolidated) information from the received plurality of radio frequency signals. The collective information corresponds to transmitted symbols collectively and concurrently obtained from the plurality of transmitting devices 108. Alternatively stated, the first received signal (i.e. the matrix Y) refers to a sum of a contribution from K number of transmitting devices (e.g. the plurality of transmitting devices 108) weighted by a plurality of channel coefficients and of an additive noise term. In this case, a block-fading channel model is considered in which the channel state is assumed to be constant during the considered T channel uses. The first received signal (i.e. the matrix Y) is derived by the following equation (equation 2).

$$Y = \Sigma_{k=1}^{K} \sqrt{P_k} s_k h_k^T + w \qquad (2)$$

Where, $Y=[y_1, \ldots, y_T]^T$ is a T×M matrix of the plurality of received signals for a plurality of antennas (i.e. 1 to M antennas) of the receiving device 104; and $y_i$ is a M-dimensional vector whose elements represent the signal received by all receiving antennas at i-th channel use (i=1, ..., T), $[.]^T$ denotes a transpose operator, and where k=1, ..., K); W is a matrix of size T×M representing a thermal noise of the channel;
$\sqrt{P_k}$ is a transmit power coefficient of a transmitting device k;

$s_k$ is a symbol vector of dimensions T and represents a symbol transmitted by a transmitting device k and carries the information on the sent sequence of bits (i.e. the sent message denoted as $m_k$); and $h_k$ is a vector of dimensions M and represents the channel between an antenna of transmitting device k and the M antennas of the receiving device 104.

In accordance with an embodiment, the receiving device 104 is further configured to generate a second received signal (i.e. a received vector y) from the first received signal (i.e. the matrix Y), as an output of the pre-processing operations (i.e. the output signal). The second received signal (i.e. a received vector y) is a vectorized form of the matrix data structure of the matrix Y. In the pre-processing operations, the synchronization in time and frequency of the receiving device 104 with the transmitted symbol is executed to slice the T channel uses (e.g. in the time-frequency grid) in order to output all elements of the second received signal (i.e. the received vector y). The pre-processing operations are further described, for example, in FIG. 4B. The second received signal (i.e. the received vector y) at the receiving device 104 is derived from the following equation (equation 3).

$$y = \Sigma_{k=1}^{K} \sqrt{P_k} s_k \otimes h_k + w \qquad (3)$$

where, y is a TM vector corresponding to a vectorized version of the matrix Y; and w is a TM vector corresponding to a vectorized version of the matrix W.

The receiving device 104 is further configured to estimate a plurality of symbol vectors from the received plurality of radio frequency signals in digital domain, and segregate the plurality of symbol vectors. Moreover, the receiving device 104 is further configured to decode each segregated symbol vectors to obtain a plurality of decoded messages. Each decoded message has a sequence of bits that corresponds to data associated with a corresponding transmitting device of the plurality of transmitting devices 108. The receiving device 104 provides a plurality of estimated symbol vectors (i.e. $\hat{s}_1, \ldots, \hat{s}_R$) that corresponds to the plurality of transmitted symbols (i.e. $s_1, \ldots, s_K$). The second received signal (i.e. a received vector y) (derived from the received plurality of radio frequency signals based on the pre-processing operations) is processed to estimate the plurality of symbol vectors. Each estimated symbol vector of the plurality of symbol vectors has information of a corresponding transmitting device of the plurality of transmitting devices 108. Each estimated symbol vector is segregated to obtain the information associated with each transmitting device of the plurality of transmitting devices 108. Alternatively stated, the receiving device 104 estimates the number K active transmitters, and provides estimates of $\hat{s}_k = \hat{x}_{k,1} \otimes \ldots \otimes x_{k,d}$ for k=1, ..., K̂. Thereafter, using each $\hat{x}_{k,j}$ as input (e.g. at each decoder of the receiving device 104), a corresponding decoded message $\hat{m}_k$, is outputted. In this way, the plurality of decoded messages is obtained concurrently.

Typically, the channel state information is unknown to the receiving device 104 at the time of estimation of the plurality of symbol vectors. The channel state information refers to channel properties of the communication network 106 (i.e. a propagation channel link), based on propagation of a radio frequency signal from a transmitting device to a receiving device, for example, scattering, fading, and/or variation of power (associated with transmitted radio frequency signal) with distance.

In an implementation, the receiving device 104 is further configured to execute a first type of decoding in order to process the second received signal (i.e. a received vector y)

to estimate the plurality of symbol vectors and obtain the plurality of decoded messages. The first type of decoding is also referred to as hard demapping, which is described in detail, for example, in FIGS. 4C and 4D. In another implementation, the receiving device 104 is further configured to execute a second type of decoding in order to process the second received signal (i.e. the received vector y) to estimate the plurality of symbol vectors and obtain the plurality of decoded messages. The second type of decoding is also referred to as soft demapping, which is described in detail, for example, in FIG. 4E.

Figure 2A:
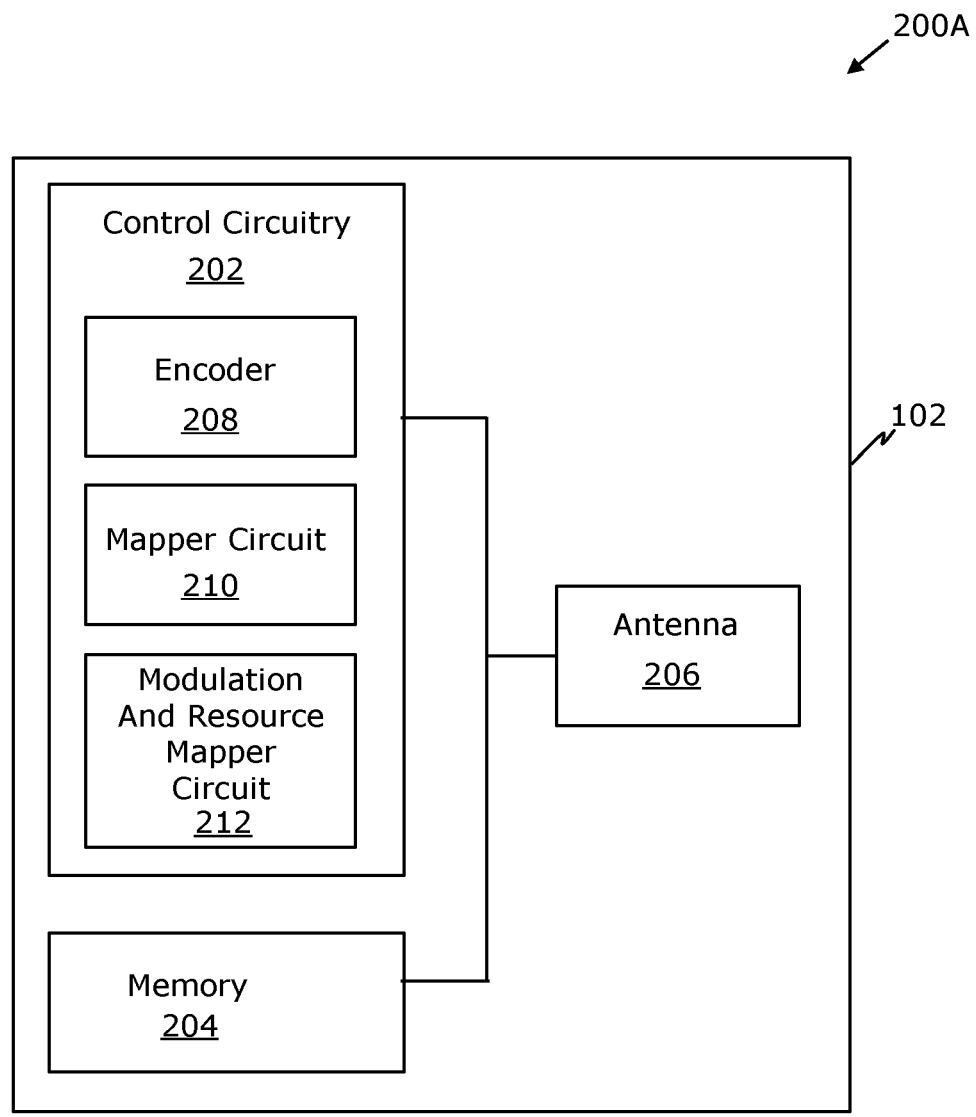
FIG. 2A is a block diagram that illustrates various exemplary components a transmitting device, in accordance with an embodiment of the present disclosure.

FIG. 2A is a block diagram that illustrates various exemplary components of a transmitting device, in accordance with an embodiment of the present disclosure. FIG. 2A is described in conjunction with elements from FIGS. 1A and 1B. With reference to FIG. 2A, there is shown a block diagram 200A of the transmitting device 102. The transmitting device 102 includes a control circuitry 202, a memory 204, and an antenna 206. The transmitting device 102 further includes an encoder 208, a mapper circuit 210, and a modulation and resource mapper circuit 212. In an implementation, the encoder 208, the mapper circuit 210, and the modulation and resource mapper circuit 212 may be a part of the control circuitry 202. In another implementation, each of the encoder 208, the mapper circuit 210, and the modulation and resource mapper circuit 212, are separate circuits or modules (and may not be a part of the control circuitry 202). The encoder 208, the mapper circuit 210, and the modulation and resource mapper circuit 212 are communicatively coupled to the memory 204 and the antenna 206. In this embodiment, the transmitting device 102 includes a single antenna, such as the antenna 206. However, in some embodiments, the transmitting device 102 potentially includes multiple antennas (multiple antennas scenario is further described in detail, for example, in FIG. 4E).

In an implementation, the control circuitry 202 is configured to execute instructions stored in the memory 204. Examples of the control circuitry 202 may include, but is not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the control circuitry 202 may refer to one or more individual processors, processing devices, a processing unit that is part of a machine.

The memory 204 may include suitable logic, circuitry, and/or interfaces that is configured to store machine code and/or instructions executable by the control circuitry 202 (e.g. a processor). The memory 204 temporally stores one or more constructed symbol vectors, which are then processed (a post-processing) by the modulation and resource mapper circuit 212. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 204 may store an operating system and/or a computer program product to operate the transmitting device 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

The antenna 206 is configured to transmit one or more constructed symbol vectors over a radio frequency signal to the receiving device 104. The one or more constructed symbol vectors represents symbols modulated in the radio frequency signal. Examples of the antenna 206 may include, but is not limited to, a radio frequency transceiver, a network interface, a telematics unit, or any antenna suitable for use in an IoT device, an IoT controller, a user equipment, a repeater, a base station or other portable or non-portable communication devices. The antenna 206 may wirelessly communicate by use of various wireless communication protocols.

The encoder 208 is a binary encoder. The encoder 208 includes suitable logic, circuitry, and/or interfaces that is configured to acquire an input message having the sequence of bits (e.g. B bits), and generate a sequence of coded bits ($B_{coded}$ bits) by application of a channel code. In a case where the channel code is not applied to the sequence of bits, the $B_{coded}$ bits is equal to the B bits.

The mapper circuit 210 includes suitable logic, circuitry, and/or interfaces configured to construct a symbol vector having a tensor structure, such as a Kronecker structure. The symbol vector is constructed based on at least one Kronecker product (or a plurality of Kronecker products) of the plurality of vectors. In an implementation, the mapper circuit 210 is configured to construct a plurality of symbol vectors that are modulated in the radio frequency signal for transmission to the receiving device 104. The mapper circuit 210 is a constellation mapper that operates based on the tensor structure, such as the Kronecker structure, where the constructed symbol vector corresponds to the constellation (e.g. a constellation of a fixed size), and the plurality of vectors correspond to the plurality of sub-constellations. The use of the Kronecker structure for signal construction (i.e. waveform design) is advantageous because it provides a reliable user separation property of the received signal at the receiver side (i.e. at the receiving device 104). For example, in massive IoT communication scenarios, different user data of each transmitting device (e.g. IoT device) can be separated and recovered with significantly reduced probability of decoding error and the number of users supported by the communication system is significantly increased as compared to conventional systems. For example, it is observed that 500 or more users (i.e. communication devices) are supported by a communication system (e.g. the system 100A or 100B) when the symbol vector having the Kronecker structure (i.e. symbol vector constructed using one or more Kronecker products) is used for signal construction, thereby significantly increasing efficiency in terms of channel utilization while reducing the probability of decoding error at the same time. In an implementation, mapper circuit 210 potentially also executes the operation of the modulation and resource mapper circuit 212.

The modulation and resource mapper circuit 212 includes suitable logic, circuitry, and/or interfaces configured to execute post-processing operations on the constructed symbol vector. For example, the modulation and resource mapper circuit 212 is configured to execute channel use mapping of the constructed symbol vector with conversion to an analog domain from digital domain, and then perform modulation to prepare for transmission by the antenna 206.

Figure 2B:
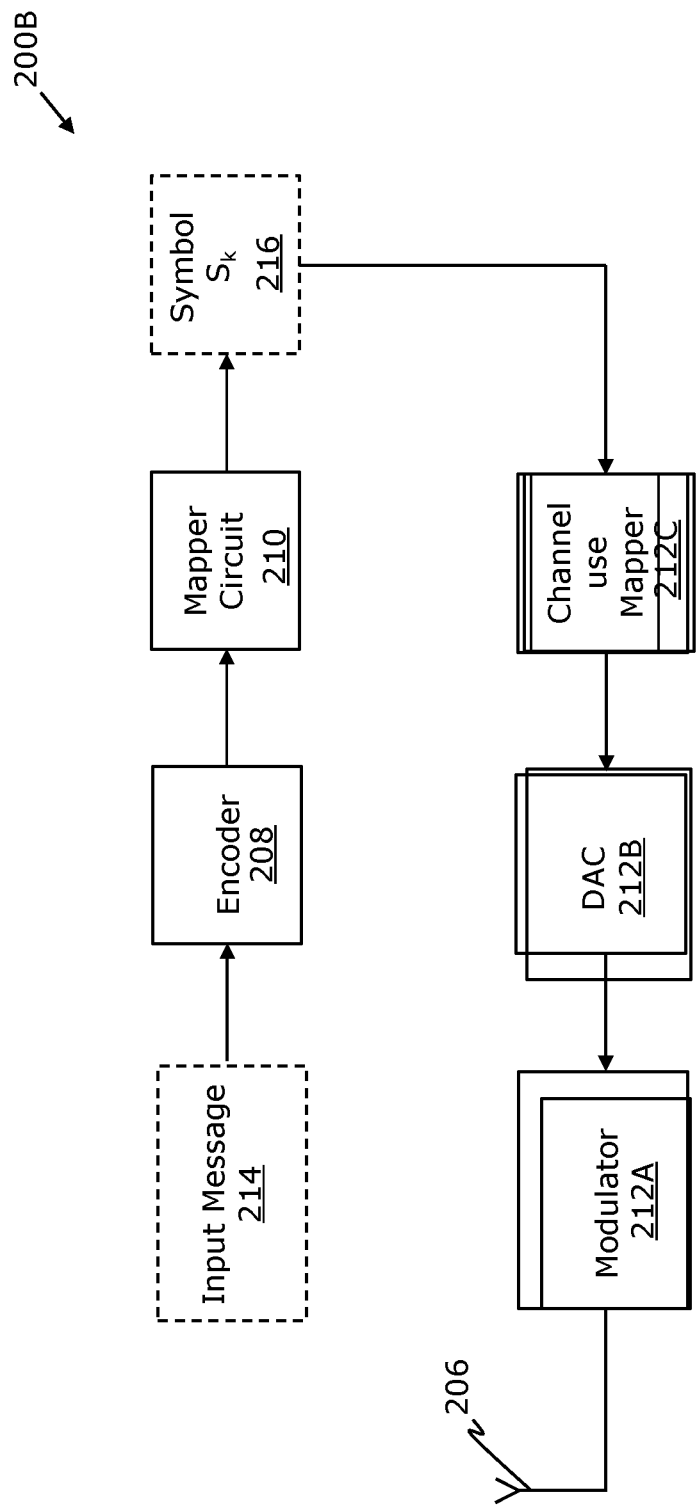
FIG. 2B is a block diagram that illustrates a processing pipeline of an input message at a transmitting device, in accordance with an embodiment of the present disclosure.

FIG. 2B is a block diagram that illustrates a processing pipeline of an input message at a transmitting device, in accordance with an embodiment of the present disclosure. FIG. 2B is described in conjunction with elements from FIGS. 1A, 1B, and 2A. With reference to FIG. 2B, there is shown a processing pipeline 200B. In the processing pipeline 200B, there is shown an input message 214 that is processed to generate a symbol vector 216 (also represented by $S_k$). There is further shown a modulator 212A, a digital-to-analog converter (DAC) 212B, a channel use mapper 212C, the antenna 206, the encoder 208, and the mapper circuit 210. In an implementation, the modulator 212A, the DAC 212B, and the channel use mapper 212C are a part of the modulation and resource mapper circuit 212 (FIG. 2A).

In the processing pipeline 200B, the encoder 208 (i.e. the binary encoder) is configured to acquire the input message 214 having a sequence of bits. The encoder 208 is further configured to form a plurality of blocks from the sequence of bits. The encoder 208 is further configured to determine a plurality of vectors for the plurality of blocks. The mapper circuit 210 is configured to construct the symbol vector 216 ($S_k$) based on at least one Kronecker product of the plurality of vectors, and provide the constructed symbol vector 216 to the channel use mapper 212C for post-processing of the constructed symbol vector 216.

The channel use mapper 212C is configured to receive the symbol vector 216 ($S_k$) from the mapper circuit 210. The channel use mapper 212C is further configured to determine a one-to-one correspondence between each element of the tensor structure of the symbol vector 216 having two or more modes and a corresponding signal frequency for channel use mapping. A product of a vector size of each of the plurality of vectors is equal to a number of channel uses. For example, a first vector, a second vector, and a third vector of the plurality of vectors from which the symbol vector 216 is constructed may have a vector size of 3, 2, and 2 respectively. Thus, in this case, the number of channel uses is 12 (i.e. 3*2*2=12). Moreover, in this case, the symbol vector 216 has a dimension T (e.g. T=12), which also indicates the number of channel uses.

The DAC 212B is configured to convert the symbol vector 216 from digital domain to analog domain. In other words, as the one-to-one correspondence (i.e. a linear or one-to-one mapping) between each element of the tensor structure of the symbol vector 216 having two or more modes and a corresponding signal frequency for channel use mapping is executed, the DAC 212B is configured to convert such corresponding signal frequency into analog domain.

The modulator 212A includes suitable logic, circuitry, and/or interfaces that is configured to modulate the symbol vector 216 in a radio frequency signal. The symbol vector 216 is mapped in a time-frequency grid using, for example, an orthogonal frequency-division multiplexing (OFDM) modulation. In other words, the converted corresponding signal frequencies (that represent the symbol vector 216) are modulated in a carrier wave to generate the radio frequency signal that is transmitted by the antenna 206 to a receiver (such as the receiving device 104 (FIG. 1A or 1B)).

Figure 2C:
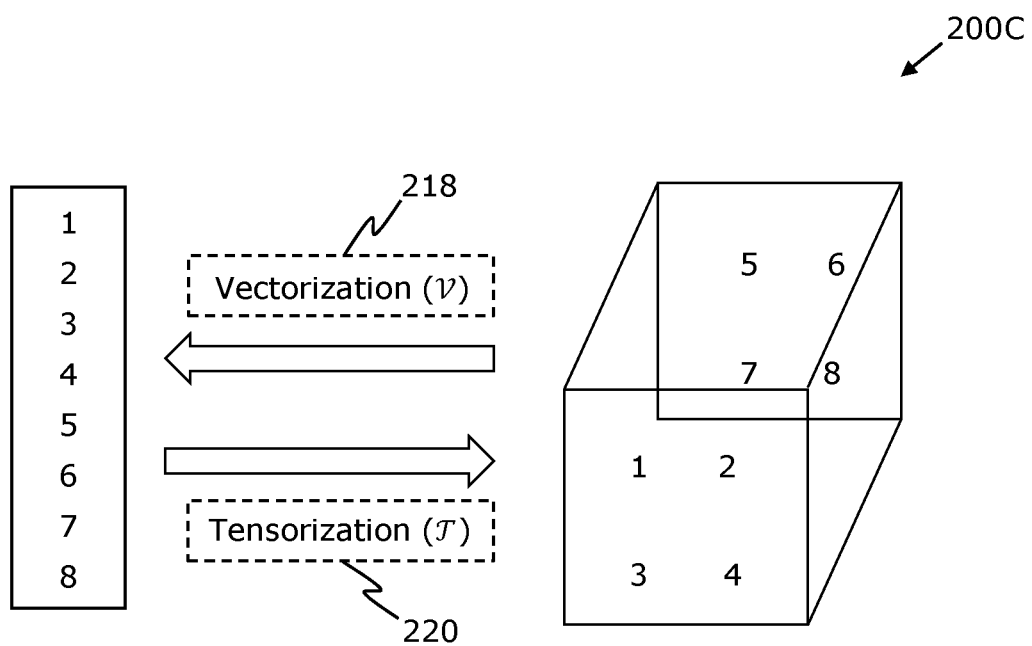
FIG. 2C is an illustration of vectorization and tensorization operations for a given vector size, in accordance with an embodiment of the present disclosure.

FIG. 2C is an illustration of a relationship between vectorization and tensorization operations for a given vector size, in accordance with an embodiment of the present disclosure. FIG. 2C is described in conjunction with elements from FIGS. 1A, 1B, and 2A. With reference to FIG. 2C, there is shown a processing pipeline 200C.

At operation 218, vectorization (denoted by an operator V) is executed, where a plurality of numbers (or elements) in a tensor structure is vectorized and stored in a vector form in a predefined order. In this example, the vector is a column vector with eight elements arranged in a predefined order (i.e. a vector of size T=8).

At operation 220, tensorization (denoted by a reverse operator τ) is executed, where the plurality of elements (or numbers) in the vector is stored in the tensor structure. In this example, a tensor of size 2×2×2 (i.e. d=3; and $T_1=T_2=T_3=2$) is shown.

The mapper circuit 210 is configured to construct the symbol vector 216 (shown in FIG. 2B) based on at least one Kronecker product of the plurality of vectors. The use of the Kronecker product is advantageous as it results in the symbol vector 216 having a definite and fixed tensor structure, specifically a Kronecker structure. The tensor structure has "d" modes (which can be construed as a d-dimensional array of real or complex numbers; in this case d=3). The d-dimensional array of real or complex numbers is of respective dimensions $T_1 \ldots T_d$ (which can be denoted as "a tensor of order "d" and size "$T_1 \times \ldots \times T_d$"). The $T=\Pi_{i=1}^{d} T_i$ numbers contained in the tensor structure can also be stored sequentially (in a predefined order) in a vector of size $T=\Pi_{i=1}^{d} T_i$ (by the vectorization V, as shown). Thus, using this correspondence, it is possible to define a sum operation on two (or more) tensors of the same size, corresponding to the tensor structure resulting from the element-wise sum of their elements. The sum operation on the tensor structure corresponds to a classical vector sum of the respective vectorized tensors. For example, in case of two vectors $a_1$, $a_2$ of dimension T, the sum of the tensor structure of the two vectors is equivalent to the tensor structure of sum of the vectorized elements, i.e. $\mathcal{T}(a_1)+\mathcal{T}(a_2)=\mathcal{T}(a_1+a_2)$. Moreover, a useful result from tensor algebra is that the decomposition of tensors of order strictly greater than 2 into rank-1 components (e.g. using the polyadic decomposition) is often essentially unique (this is not the case for matrices (which are tensors of order 2)). In an example, the polyadic decomposition is computed using, for example, Parallel Factor Analysis (PARAFAC) algorithm. In context of a communication system (e.g. the system 100A or 100B), the uniqueness of the polyadic decomposition of $\mathcal{T}(y)$ (where y refers to the received vector y of equation 3) is equivalent to a separation of the received signal (i.e. the received vector y) into its single-user components, i.e. it enables to recover all elements of the sum $(x_{k,1}, \ldots, x_{k,d}, \sqrt{P_k} h_k)$ (refer equation 3 or equation 4 given below) up to a permutation on the indices $1, \ldots, K$ and to a multiplication by a complex factor. This user separation property is exploited, and is the reason to use the Kronecker structure for signal construction. Alternatively stated, the use of the Kronecker product provides the Kronecker structure to the constructed symbol vector, which is used then beneficially used for waveform design. In general, $\mathcal{T}(y)$ is potentially a rank-K tensor of size $T_1 \times \ldots \times T_d \times M$, since it is the sum of the K rank-1 tensors $x_{k,1} \otimes \ldots \otimes x_{k,d} \otimes \sqrt{P_k} h_k$, each one corresponding to the signal received from a single user (i.e. a single transmitting device). In an example, if a noiseless case (where w=0) is considered, the received signal y thus is potentially represented by the following equation (equation 4).

$$y = \sum_{k=1}^{K} x_{k,1} \otimes \ldots \otimes x_{k,d} \otimes \sqrt{P_k} h_k \qquad (4)$$

In accordance with an embodiment, beneficially, the one-to-one correspondence between each element of the tensor structure of the symbol vector 216 having d modes (two or more modes) into corresponding signal frequency in order to modulate the symbol vector 216 in a radio frequency signal, simplifies the waveform design of the radio frequency signal.

Figure 3A:
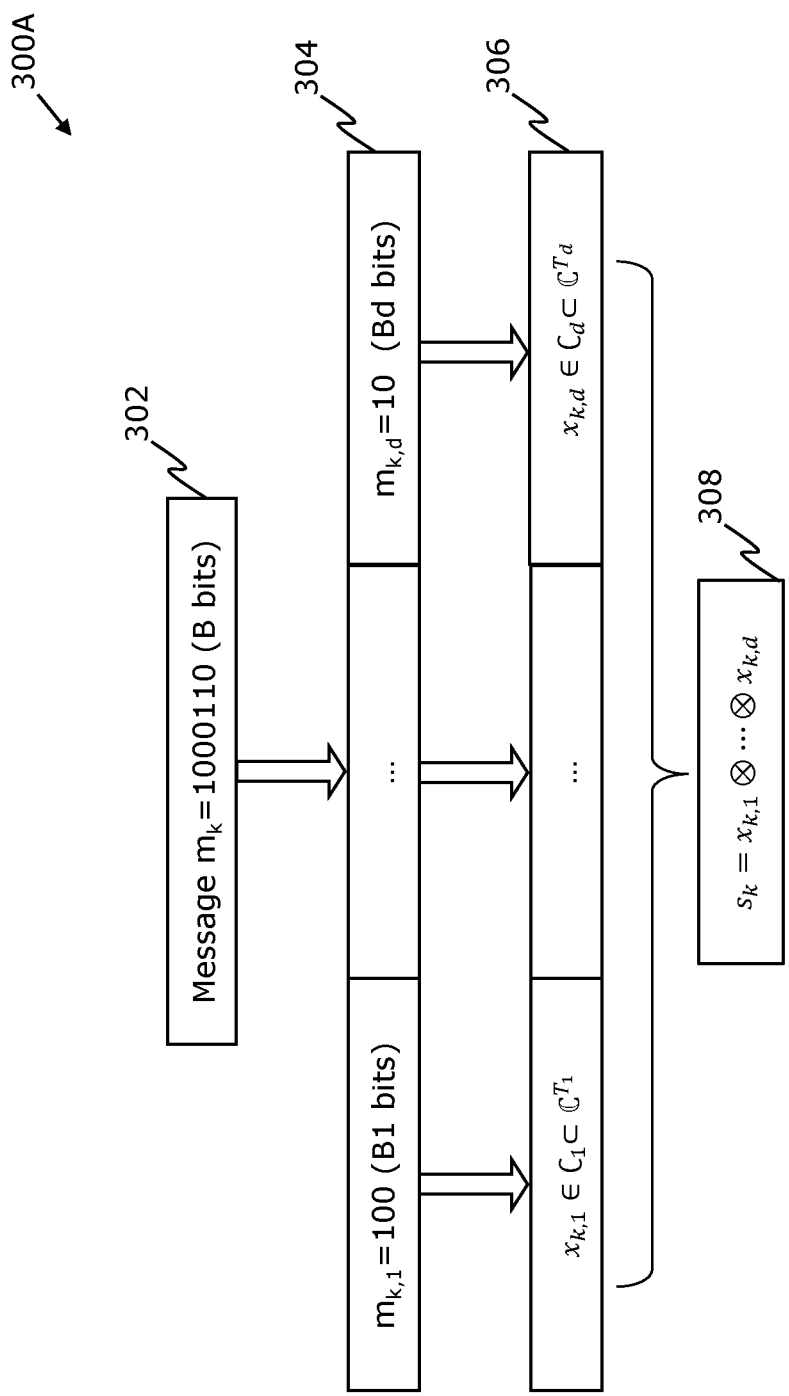
FIG. 3A is an illustration of an exemplary scenario that depicts processing of an exemplary input message without channel coding at a transmitting device, in accordance with an embodiment of the present disclosure.

FIG. 3A is an illustration of an exemplary scenario that depicts processing of an exemplary input message without channel coding at a transmitting device for random-access communication, in accordance with an embodiment of the present disclosure. FIG. 3A is described in conjunction with elements from FIGS. 1A, 1B, and 2A to 2C. With reference to FIG. 3A, there is shown an exemplary scenario 300A, in which an input message is processed without channel coding at the transmitting device 102 for a random-access communication.

In accordance with the exemplary scenario 300A, at operation 302, the encoder 208 of the transmitting device 102 is configured to acquire an input message $m_k$ having a sequence of seven bits (i.e. $m_k$=1000110; B=7 bits) where k in the message ($m_k$) refers to a $k^{th}$ transmitting device (e.g. the transmitting device 102).

At operation 304, the encoder 208 is further configured to form a plurality of blocks (i.e. $m_{k,1}, \ldots, m_{k,d}$, where d is an arbitrary number) by splitting the sequence of seven bits of the input message ink. In this exemplary scenario, a first block (represented by $m_{k,1}$) has a subsequence of first 3 bits (i.e. $m_{k,i}$=100; $B_1$=3 bits) of the sequence of seven bits of the input message $m_k$. Similarly, a d-th block (represented by $m_{k,d}$) has a subsequence of last 2 bits (i.e. $m_{k,d}$=10; $B_d$=2 bits) of the sequence of seven bits of the input message $m_k$. A sum of a number of bits of the subsequence (i.e. $B_1, \ldots, B_d$) corresponding to each of the plurality of blocks ($m_{k,1}, m_{k,d}$) is equal to the number of B bits (i.e. $B = \Sigma_{i=1}^{d} B_i$) of the input message ink.

At operation 306, the encoder 208 is further configured to determine a plurality of vectors (i.e. $x_{k,1}, \ldots, x_{k,d}$) for the plurality of blocks ($m_{k,1}, \ldots, m_{k,d}$). A first vector (represented by $x_{k,1}$) of the plurality of vectors ($x_{k,1}, \ldots, x_{k,d}$) corresponds to the first block ($m_{k,1}$), where k in the first vector ($x_{k,1}$) refers to a $k^{th}$ transmitting device (e.g. the transmitting device 102). Similarly, a d-th vector (represented by $x_{k,d}$) corresponds to the d-th block ($m_{k,d}$). The plurality of blocks ($x_{k,1}, \ldots, x_{k,d}$) corresponds to a plurality of sub-constellations (i.e. $C_1, \ldots, C_d$). In an example, the encoder 208 determines the plurality of sub-constellations ($C_1, \ldots, C_d$) on the basis of a Grassmannian constellation structure.

At operation 308, the mapper circuit 210 of the transmitting device 102 is configured to construct a symbol vector (i.e. $s_k$) based on a Kronecker product of the plurality of vectors (i.e. $x_{k,1} \otimes \ldots \otimes x_{k,d}$). The construction of the symbol vector ($s_k$) also refers to a constellation mapping as the plurality of sub-constellations (i.e. $C_1, \ldots, C_d$) are mapped to a fixed constellation (i.e. the symbol vector $s_k$ that corresponds to the constellation).

Figure 3B:
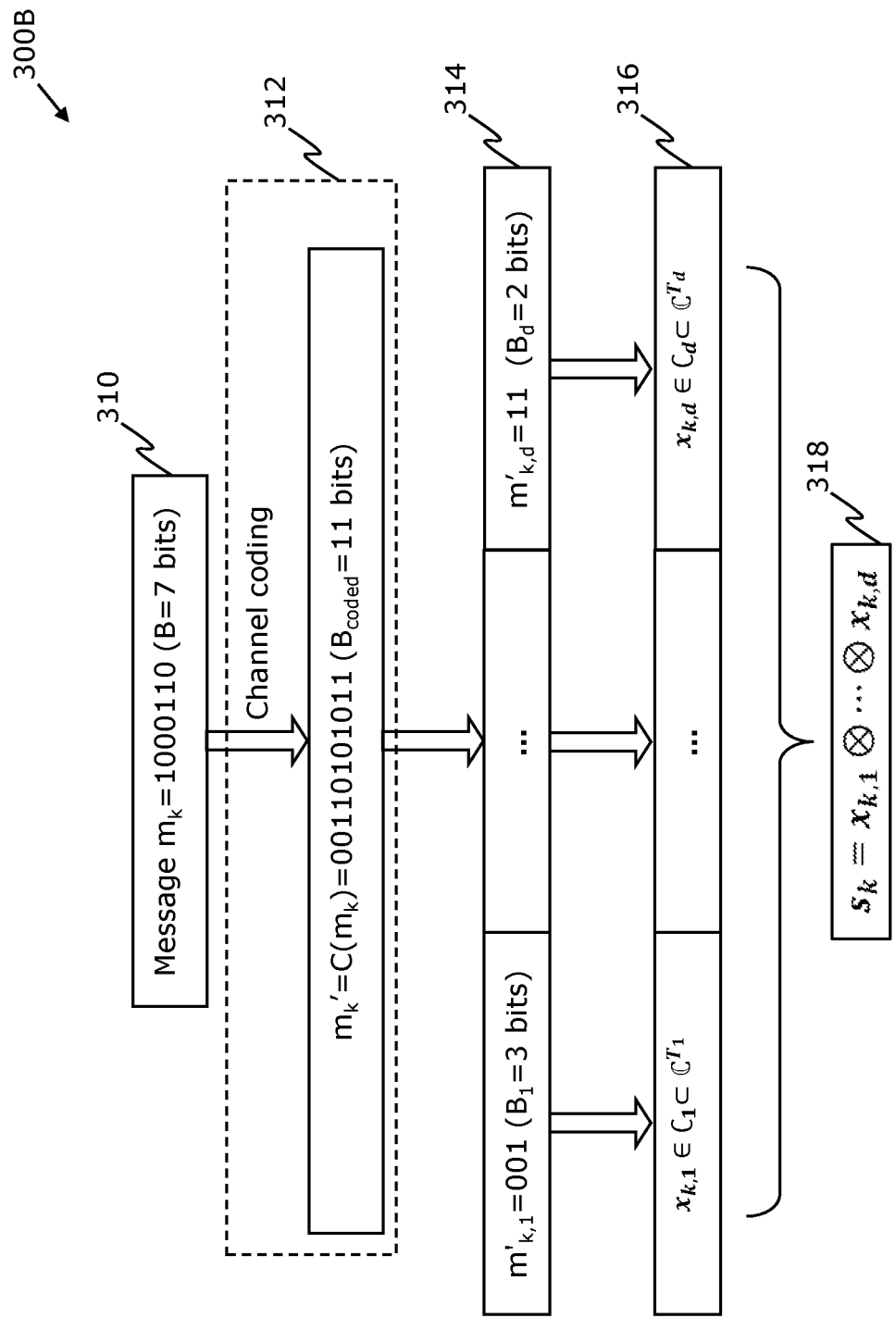
FIG. 3B is an illustration of an exemplary scenario that depicts processing of an exemplary input message with channel coding at a transmitting device, in accordance with another embodiment of the present disclosure.

FIG. 3B is an illustration of an exemplary scenario that depicts processing of an exemplary input message with channel coding at a transmitting device for random-access communication, in accordance with another embodiment of the present disclosure. FIG. 3B is described in conjunction with elements from FIGS. 1A, 1B, and 2A to 2C. With reference to FIG. 3B, there is shown an exemplary scenario 300B that depicts processing of an exemplary input message with channel coding at the transmitting device 102 for a random-access communication.

In accordance with the exemplary scenario 300B, at operation 310, the encoder 208 of the transmitting device 102 is configured to acquire an input message $m_k$ having a sequence of seven bits (i.e. $m_k$=1000110; B=7 bits) where k in the input message ($m_k$) refers to a $k^{th}$ transmitting device (i.e. the transmitting device 102).

At operation 312, the encoder 208 is further configured to encode the sequence of bits by use of a channel code (e.g. a channel code C) that adds redundancy to the sequence of bits to obtain a sequence of coded bits (i.e. $m_k' = C(m_k)$= 00110101011 ($B_{coded}$=11 bits)).

At operation 314, the encoder 208 is further configured to form a plurality of blocks (i.e. $m'_{k,1}, \ldots, m'_{k,d}$, where d is an arbitrary number) from the sequence of coded bits. In this exemplary scenario, the sequence of 11 coded bits (i.e. $m_k'=C(m_k)$=00110101011; $B_{coded}$=11 bits) is split into d blocks. A first block (represented by $m'_{k,1}$) has a subsequence of first 3 bits (i.e. $m'_{k,1}$=001; $B_1$=3 bits) of the sequence of 11 coded bits. Similarly, a d-th block (represented by $m'_{k,d}$) has a subsequence of last 2 bits (i.e. $m'_{k,d}$=11; $B_d$=2 bits) of the sequence of 11 coded bits. A sum of a number of bits of the subsequence (i.e. $B_1, \ldots, B_d$) corresponding to each of the plurality of blocks (i.e. $m'_{k,1}, \ldots, m'_{k,d}$) is equal to the number of $B_{coded}$ bits i.e. $B_{coded} = \Sigma_{i=1}^{d} B_i$.

At operation 316, the encoder 208 is further configured to determine a plurality of vectors (i.e. $x_{k,1}, \ldots, x_{k,d}$) for the plurality of blocks ($m'_{k,1}, \ldots m'_{k,d}$). A first vector (represented by $x_{k,1}$) of the plurality of vectors ($x_{k,1}, \ldots, x_{k,d}$) corresponds to the first block ($m'_{k,1}$), where k in the first vector ($x_{k,1}$) refers to a $k^{th}$ transmitting device (i.e. the transmitting device 102). Similarly, a d-th vector (represented by $x_{k,d}$) corresponds to the d-th block ($m'_{k,d}$). The plurality of blocks ($x_{k,1}, \ldots, x_{k,d}$) corresponds to a plurality of sub-constellations (i.e. $C_1, \ldots, C_d$).

At operation 318, the mapper circuit 210 of the transmitting device 102 is configured to construct a symbol vector (i.e. $s_k$) based on a Kronecker product of the plurality of vectors (i.e. $x_{k,1} \otimes \ldots \otimes x_{k,d}$). The construction of the symbol vector ($s_k$) also refers to the constellation mapping. The constellation ($s_k$) has a number of elements equal to $2^{B_{coded}}$ elements.

Figure 4A:
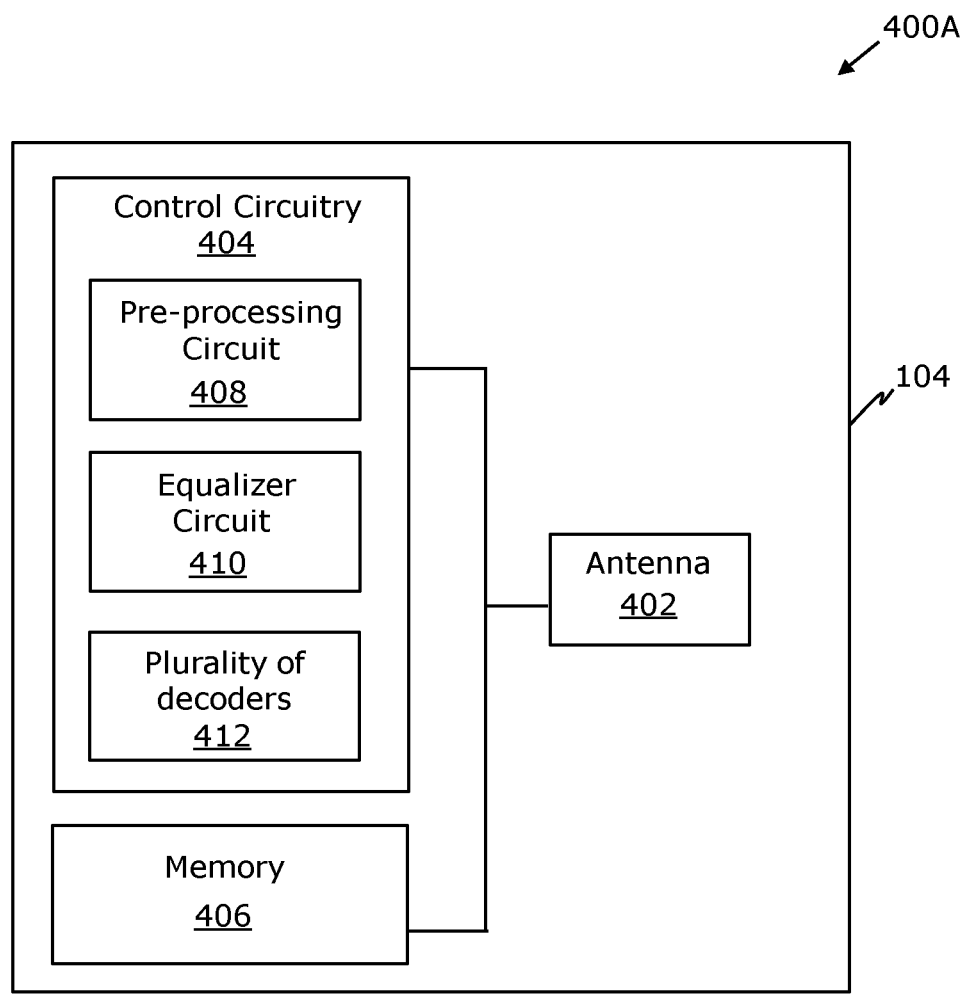
FIG. 4A is a block diagram that illustrates various exemplary components a receiving device, in accordance with an embodiment of the present disclosure.

FIG. 4A is a block diagram that illustrates various exemplary components of a receiving device, in accordance with an embodiment of the present disclosure. FIG. 4A is described in conjunction with elements from FIGS. 1A, 1B, 2A to 2C, 3A, and 3B. With reference to FIG. 4A, there is shown a block diagram 400A of the receiving device 104. The receiving device 104 includes at least one antenna 402, a control circuitry 404, and a memory 406. The receiving device 104 further includes a pre-processing circuit 408, an equalizer circuit 410, and a plurality of decoders 412. In an implementation, the pre-processing circuit 408, the equalizer circuit 410, and the plurality of decoders 412 may be a part of the control circuitry 404. In another implementation, each of the pre-processing circuit 408, the equalizer circuit 410, and the plurality of decoders 412, are separate circuits or modules (and may not be a part of the control circuitry 404). The pre-processing circuit 408, the equalizer circuit 410, and the plurality of decoders 412 are communicatively coupled to the memory 406 and the antenna 402. The receiving device 104 includes at least one antenna, such as the antenna 402 (or 1, 2, 3 …, M number of antennas).

The at least one antenna 402 is configured to receive a plurality of radio frequency signals concurrently from a plurality of transmitting devices 108. Beneficially, the number of receiving antennas at the receiving device 104 is potentially less than number of transmitting signals. Examples of implementation of the antenna 402 is similar to that of the antenna 206 (FIG. 2A).

In an implementation, the control circuitry 404 is configured to estimate a plurality of symbol vectors from the received plurality of radio frequency signals in digital domain, and segregate the plurality of symbol vectors. The control circuitry 404 is configured to execute instructions stored in the memory 406. Examples of implementation of the control circuitry 404 is similar to that of the control circuitry 202 (FIG. 2A). Similarly, examples of implementation of the memory 406 is similar to that of the memory 204 of FIG. 2A.

The pre-processing circuit 408 is configured to execute pre-processing operations to generate an output signal (e.g. a received vector y) in digital domain from the received plurality of radio frequency signals. The pre-processing circuit 408 executes the pre-processing operations, such as demodulation of each of the received plurality of radio frequency signals, conversion of the demodulated signals in analog domain to a digital domain, followed by resource demapping, in which symbol synchronization and slicing is performed to generate a first received signal (i.e. a matrix Y), which is then vectorized using the vectorization operation to generate a second received signal (i.e. the received vector y using equation 3), which is the output signal of the pre-processing circuit 408.

The equalizer circuit 410 is a non-coherent equalizer in which a channel state information is unknown when the plurality of symbol vectors is estimated. The equalizer circuit 410 is also referred to as a multi-user separator or a multi-user non-coherent equalizer. The equalizer circuit 410 is configured to estimate a plurality of symbol vectors from the output signal that is received from the pre-processing circuit 408.

In an implementation, the equalizer circuit 410 is further configured to execute a first type of decoding in which the equalizer circuit 410 is configured to utilize a first parameter that represents a maximum possible number of the plurality of decoded messages to estimate a number of active transmitting devices. In a case where a number of active transmitting devices (i.e. K) is unknown to the receiving device 104, the receiving device 104 utilizes the first parameter (i.e. $K_{max}$) to represent the maximum number of decoded messages based on the output signal (i.e. the received vector y). The first parameter (i.e. $K_{max}$) is chosen as a conservative upper bound on the active number of transmitting devices (i.e. K). The first parameter is assumed to be greater than or at least equal to the active number of transmitting devices (i.e. $K_{max} \geq K$). The equalizer circuit 410 is further configured to execute the first type of decoding based on a maximum likelihood decoding or a canonical polyadic decomposition. The canonical polyadic decomposition of a higher-order tensor is decomposition in a minimal number of rank-1 tensors. The equalizer circuit 410 is further configured to utilize a second parameter that represents a power threshold, wherein the power threshold is used to discard a subset of the estimated plurality of symbol vectors. The operations of the equalizer circuit 410 related to the first type of decoding is further described in detail, for example, in FIGS. 4C and 4D. In another implementation, the equalizer circuit 410 is configured to execute a second type of decoding in which the equalizer circuit 410 is configured to compute a posterior distribution of each symbol vector of the plurality of symbol vectors based on prior information of a total number of the estimated plurality of symbol vectors. The operations of the equalizer circuit 410 related to the second type of decoding is further described in detail, for example, in FIG. 4E.

Each of the plurality of decoders 412 is a single-user decoder, which is configured to decode at least one segregated symbol vector of the estimated plurality of symbol vectors. Each decoded message of the plurality of decoded messages has a sequence of bits that corresponds to data associated with a corresponding transmitting device of the plurality of transmitting devices 108.

In an implementation, at least one decoder of the plurality of decoders 412 is further configured to execute a de-mapping of each vector of the plurality of vectors associated with the first segregated symbol vector to obtain a plurality of part messages. In an example, the plurality of vectors (e.g. $\hat{z}_{k,1}, \ldots, \hat{z}_{k,d}$) corresponds to a plurality of vectors (i.e. $x_{k,1}, \ldots, x_{k,d}$) formed by one transmitting device of the plurality of transmitting devices 108. The estimated part message (e.g. $\hat{m}_{k,1}$) corresponds to a block (i.e. $\hat{m}_{k,1}$) formed by one transmitting device of the plurality of transmitting devices 108. Similarly, the plurality of part messages (e.g. $\hat{m}_{k,1}, \ldots, \hat{m}_{k,d}$) corresponds to a plurality of blocks (i.e. $m_{k,1}, \ldots, m_{k,d}$) formed by one transmitting device of the plurality of transmitting devices 108. The at least one decoder of the plurality of decoders 412 is further configured to concatenate the plurality of part messages to re-construct a message having a sequence of bits. In continuation to the above example, a decoded message (i.e. $\hat{m}_k$) corresponds to an input message (i.e. $m_k$) of one transmitting device of the plurality of transmitting devices (i.e. 108). The decoded message (i.e. $\hat{m}_k$) has a bit length (i.e. B bits) same as the bit length (i.e. B bits) of the input message (i.e. $m_k$, a transmitted message).

In another implementation, the at least one decoder of the plurality of decoders 412 is further configured to concatenate the plurality of part messages to obtain a sequence of coded bits. In such implementation, the at least one decoder of the plurality of decoders 412 is further configured to decode the sequence of coded bits by use of an inverse channel code that removes redundancy from the sequence of coded bits to re-construct a message having a sequence of bits. In a case where one of the plurality of transmitting devices 108 uses a channel code, the plurality of part messages obtained at the receiving device 104 is denoted as $\hat{m}_{k,1}, \ldots, \hat{m}_{k,1}^{coded}$. The part message (e.g. $\hat{m}_{k,1}^{coded}$) corresponds to a part of the coded input message (i.e. $\hat{m}_{k,1}^{coded}$) of one transmitting device of the plurality of transmitting devices 108. The operations of the plurality of decoders 412 related to the first type of decoding is further described in detail, for example, in FIGS. 4C and 4D. Moreover, the operations of the plurality of decoders 412 related to the second type of decoding is further described in detail, for example, in FIG. 4E.

Figure 4B:
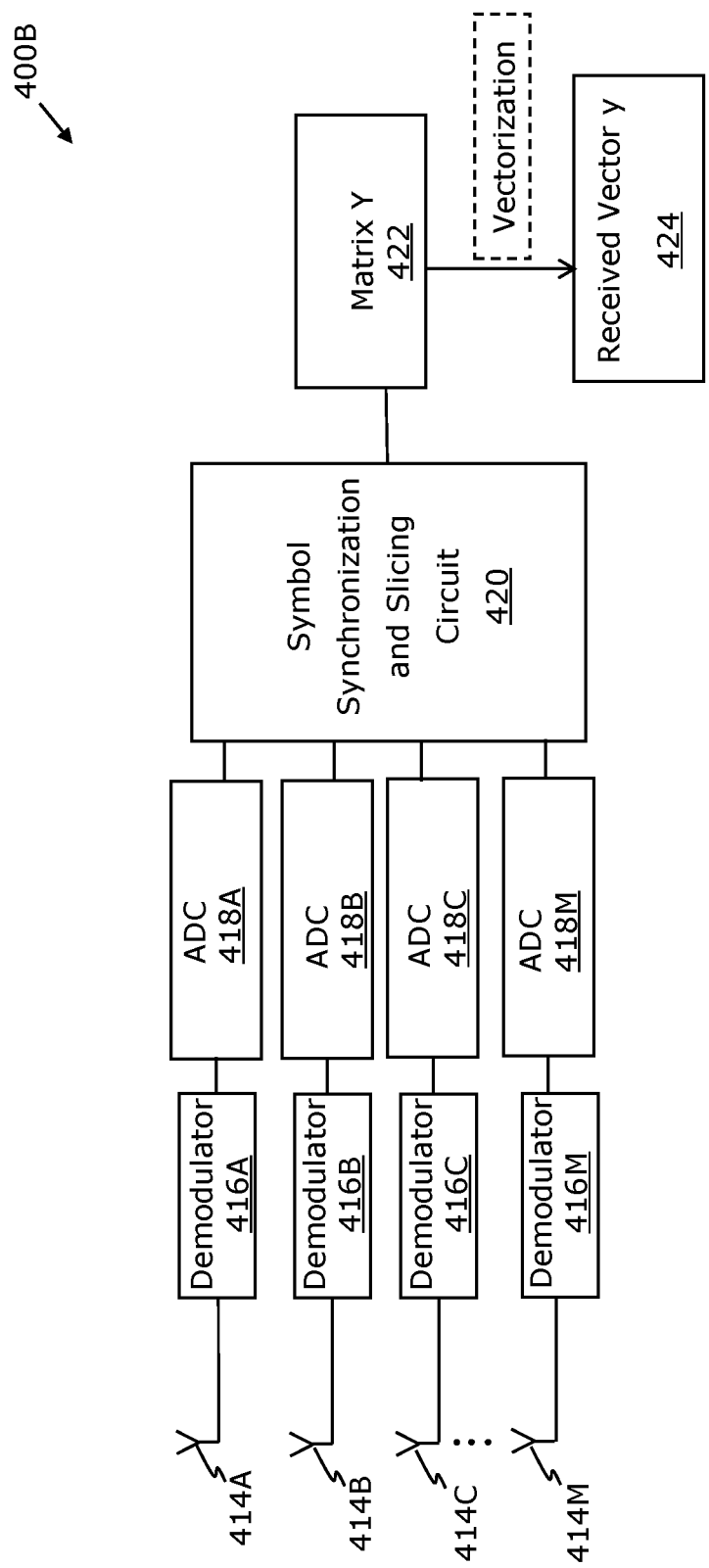
FIG. 4B is an illustration of pre-processing operations at a receiving device, in accordance with an embodiment of the present disclosure.

FIG. 4B is an illustration of pre-processing operations at a receiving device, in accordance with an embodiment of the present disclosure. FIG. 4B is described in conjunction with elements from FIGS. 1A, 1B, 2A to 2C, 3A, 3B, and 4A. With reference to FIG. 4B, there is shown a block diagram 400B that includes a plurality of antennas (e.g. antennas 414A, 414B, 414C, ..., 414M), a plurality of demodulators (e.g. demodulators 416A, 416B, 416C, ..., 416M), a plurality of analog-to-digital converters (e.g. ADCs 418A, 418B, 418C, ..., 418M), a symbol synchronization and slicing circuit 420, a matrix Y 422, and a received vector y 424. In an implementation, the plurality of antennas, the plurality of demodulators, the plurality of ADCs, and the symbol synchronization and slicing circuit 420, are part of the pre-processing circuit 408.

At least one antenna of the antennas 414A, 414B, 414C, ..., 414M of the receiving device 104 is configured to receive concurrently the plurality of radio frequency signals (in analog domain) transmitted by the plurality the transmitting devices 108. Each of the demodulators 416A, 416B, 416C, ..., 416M is configured to demodulate at least one received radio frequency signal of the plurality of received radio frequency signals. In an example, each of the demodulators 416A, 416B, 416C, ..., 416M may be an OFDM demodulator, which demodulates corresponding radio frequency signal by the use of a fast Fourier transform (FFT) operation. Each of the ADCs 418A, 418B, 418C, . . . , 418M is configured to convert a corresponding demodulated radio frequency signal of the plurality of received radio frequency signals from analog domain to digital domain.

The symbol synchronization and slicing circuit 420 is configured to execute resource demapping, in which symbol synchronization and slicing is performed to generate a first received signal (i.e. the matrix Y 422). The first received signal (i.e. the matrix Y 422) derived using equation (3) (of FIG. 1B) has a matrix data structure that represents collective (or consolidated) information from the received plurality of radio frequency signals. In an implementation, the symbol synchronization and slicing circuit 420 is configured to maintain synchronization in time-frequency grid of the receiving device 104. The synchronization in time and frequency of the receiving device 104 with the transmitted symbol is executed to slice the T channel uses (e.g. in the time-frequency grid) in order to output all elements of the second received signal (i.e. the received vector y 424). In another implementation, the symbol synchronization and slicing circuit 420 is configured for slicing of channel uses in the time-frequency grid in a New Radio (NR) standard. The matrix Y 422 is then vectorized (using vectorization) to obtain the second received signal (i.e. received vector y 424) using equation 3 (FIG. 1B).

Figure 4C:
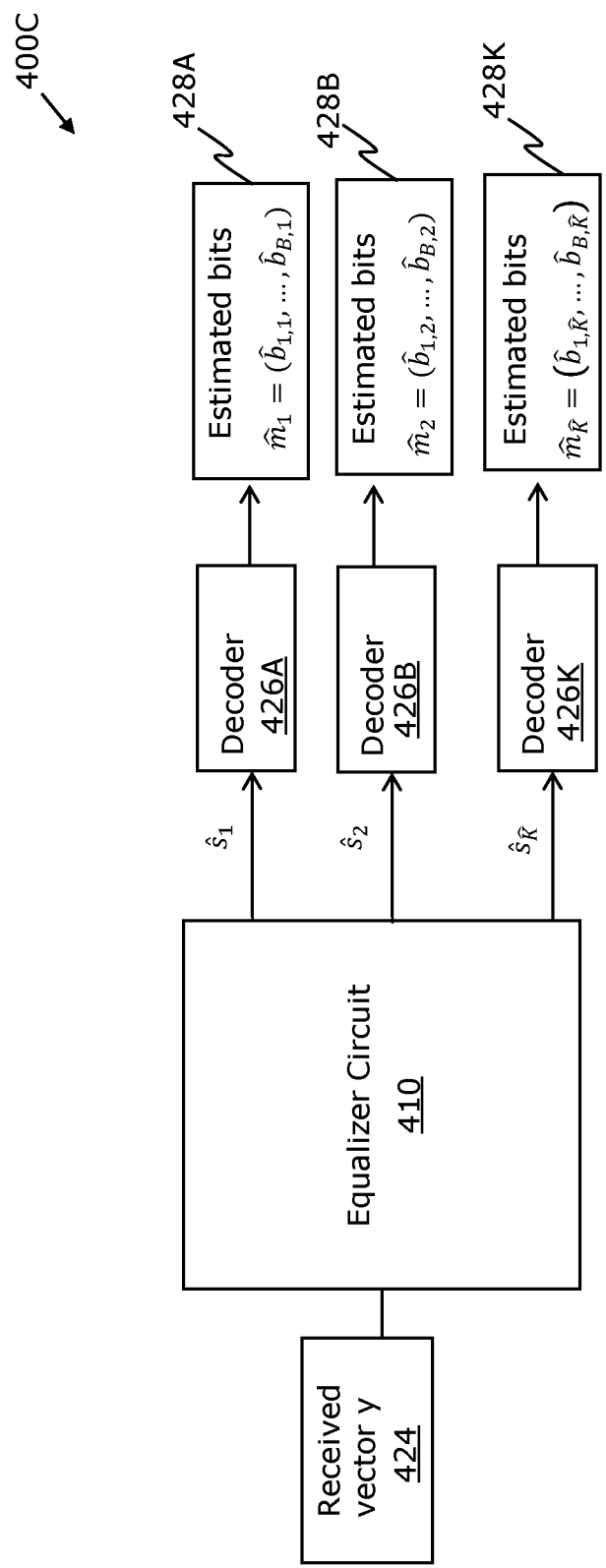
FIG. 4C is an illustration of a processing pipeline at a receiving device using a first type of decoding, in accordance with an embodiment of the present disclosure.

FIG. 4C is an illustration of a processing pipeline at a receiving device post the pre-processing operations of FIG. 4B using a first type of decoding, in accordance with an embodiment of the present disclosure. FIG. 4C is described in conjunction with elements from FIGS. 1A, 1B, 2A to 2C, 3A, 3B, 4A, and 4B. With reference to FIG. 4C, there is shown a processing pipeline 400C for the first type of decoding (e.g. the hard demapping). There is further shown a plurality of decoders (e.g. decoders 426A, 426B, . . . , 426K), and a plurality of decoded messages 428A, 428B, . . . , 428K (e.g. also represented by estimated bits).

The equalizer circuit 410 is configured to estimate a plurality of symbol vectors (i.e. $\hat{s}_1, \hat{s}_2, \ldots, \hat{s}_R$) from the received vector y 424, and segregate the plurality of symbol vectors. The received vector y 424 at the equalizer circuit 410 is represented in the following equation.

$$y = \sum_{k=1}^{K} \sqrt{P_k} s_k \otimes h_k + w = \sum_{k=1}^{K} x_{k,1} \otimes \ldots \otimes x_{k,d} \otimes \tilde{h}_k + w \quad (5)$$

where, $\tilde{h}_k = \sqrt{P_k} h_k$.

The equalizer circuit 410 is a non-coherent equalizer in which a channel state information (CSI) is unknown when the plurality of symbol vectors is estimated. The equalizer circuit 410 is configured to execute a first type of decoding in which the equalizer circuit 410 is configured to utilize a first parameter $K_{max}$ that represents a maximum possible number of a plurality of decoded messages to estimate a number of active transmitters. The equalizer circuit 410 is configured to execute the first type of decoding based on a maximum likelihood decoding or a canonical polyadic decomposition, which is described in details, for example, in FIG. 4D.

Each of the decoders 426A, 426B, . . . , 426K refers to a single-user decoder, which is configured to decode one segregated symbol vector ($\hat{s}_1$) of the estimated plurality of symbol vectors ($\hat{s}_1, \hat{s}_2, \ldots, \hat{s}_R$) to obtain the plurality of decoded messages 428A, 428B, . . . , 428K (e.g. also represented as estimated bits or estimated messages $\hat{m}_1, \hat{m}_2, \ldots, \hat{m}_{\hat{K}}$). For example, the decoded message 428A has a sequence of estimated bits (e.g. $\hat{m}_1 = (\hat{b}_{1,1}, \ldots, \hat{b}_{B,1})$) that corresponds to data associated with a corresponding transmitting device of the plurality of transmitting devices 108. Similarly, K-th decoded message 428K ($\hat{m}_{\hat{K}}$) has a sequence of estimated bits (e.g. $\hat{m}_{\hat{K}} = (\hat{b}_1, \hat{K}, \ldots, \hat{b}_{B, \hat{K}})$) that corresponds to data associated with the K-th transmitting device 108K of the plurality of transmitting devices 108.

Figure 4D:
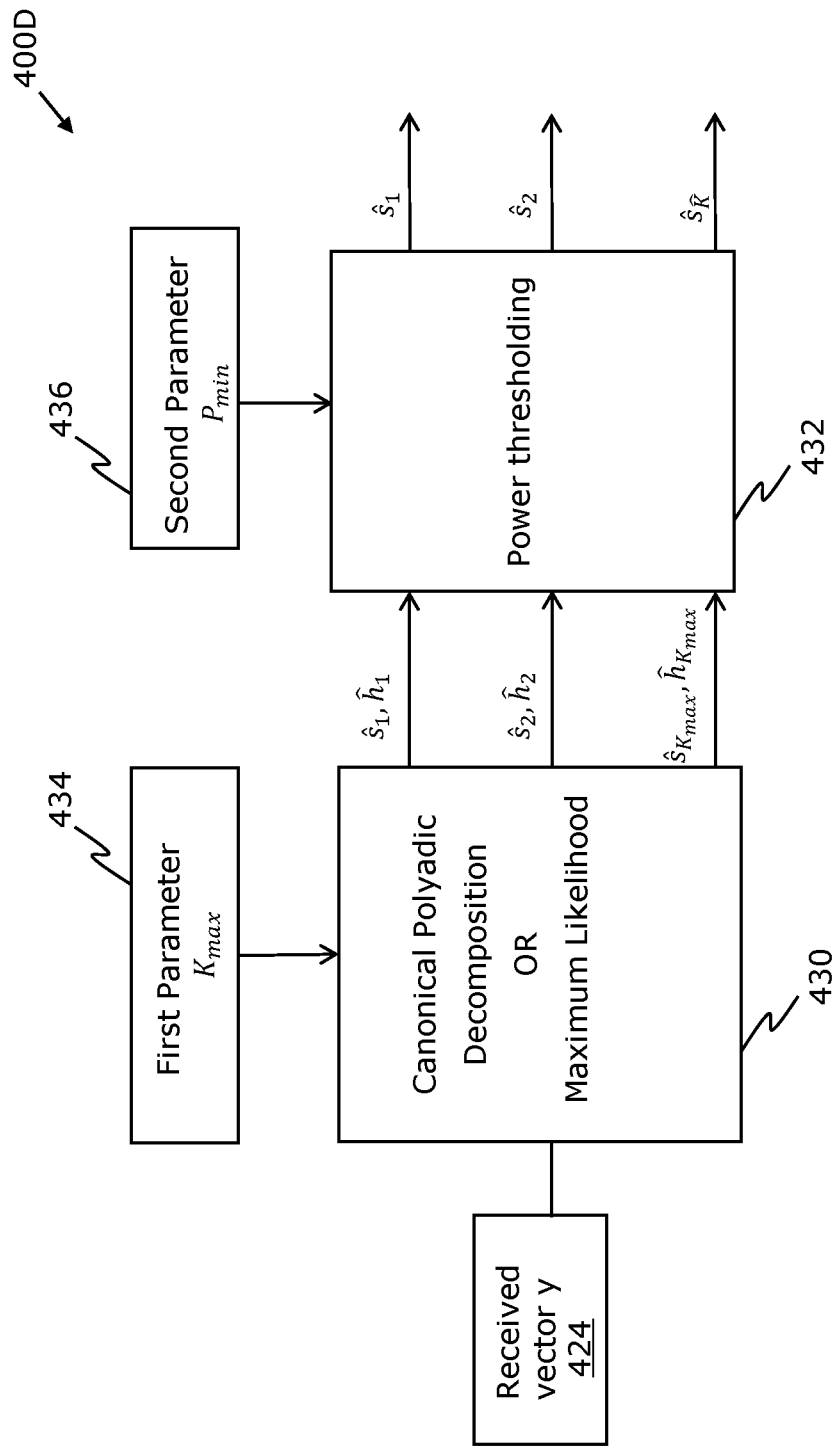
FIG. 4D is an illustration of exemplary first type of decoding operations at a receiving device, in accordance with an embodiment of the present disclosure.

FIG. 4D is an illustration of an exemplary first type of decoding operations 400D at an equalizer circuit of a receiving device, in accordance with an embodiment of the present disclosure. FIG. 4D is described in conjunction with elements from FIGS. 1A, 1B, 2C, and 4C. With reference to FIG. 4D, there is shown operations 430 and 432, a first parameter 434, a second parameter 436, and the received vector y 424.

At operation 430, the equalizer circuit 410 of the receiving device 104 is configured to execute the first type of decoding on the received vector y 424. The first type of decoding is executed based on a maximum likelihood decoding or a canonical polyadic decomposition. The equalizer circuit 410 is configured to estimate the plurality of symbol vectors ($\hat{s}_1, \hat{s}_2, \ldots, \hat{s}_{\hat{K}}$) from the received vector y 424. The plurality of symbol vectors ($\hat{s}_1, \hat{s}_2, \ldots, \hat{s}_{\hat{K}}$) corresponds to the plurality of transmitted symbol vectors ($s_1, s_2, \ldots, s_K$). The identities (i.e. k indices) of the plurality of transmitting devices is not known by the equalizer circuit, therefore, the plurality of decoded messages is decoded up to a permutation of the indices (i.e. 1, . . . , K). The equalizer circuit 410 is further configured to utilize the first parameter 434 (i.e. $K_{max}$) that represents a maximum possible number of the plurality of decoded messages to estimate a number of active transmitting devices. The first parameter 434 ($K_{max}$) is chosen as a conservative upper bound on the estimated number of active transmitting devices. Therefore, first parameter 434 ($K_{max}$) is potentially greater than or equal to the number of transmitting devices (i.e. $K_{max} \geq K$).

In the operation 430, in a case where the maximum likelihood decoding is selected, an exhaustive search on the constellation and a linear estimation of $h_k$ for $k=1, \ldots, K_{max}$, is performed. The maximum likelihood decoding provides a solution of an optimization equation (6). The optimization is performed on discrete domain $C_1, \ldots, C_d$.

$$\left(\hat{z}_{k,1}, \ldots, \hat{z}_{k,d}, \hat{\tilde{h}}_k\right)_{k=1, \ldots, K_{max}} = \underset{(z_{k,1} \in C_1, \ldots, z_{k,d} \in C_d, h_k \in \mathbb{C}^M)_{k=1, \ldots, K_{max}}}{\mathrm{argmin}} \left\| y - \sum_{k=1}^{K_{max}} z_{k,1} \otimes \ldots \otimes z_{k,d} \otimes h_k \right\| \quad (6)$$

At operation 432, optionally, power thresholding is executed. The equalizer circuit 410 is further configured to utilize the second parameter 436 (i.e. $P_{min}$) that represents a power threshold, where the power threshold is used to discard a subset of the estimated plurality of symbol vectors. In an example, the subset of the estimated plurality of symbol vectors is discarded when a power associated with each of the estimated plurality of symbol vectors is less than the power threshold to obtain the subset. Thus, in accordance with the equation (6), in case of the maximum likelihood decoding, after the subset of the estimated plurality of symbol vectors is discarded, remaining estimated symbol vectors of the estimated plurality of symbol vectors is represented by $\hat{K}$, which indicates an accurate estimate of active transmitting devices, i.e. $\hat{K}$. Moreover, in the case where the maximum likelihood decoding is selected, the use of the second parameter 436 (i.e. $P_{min}$) for the power thresholding is represented by the following equation (equation 7).

$$\hat{K} = |\{1 \leq k \leq K_{max} | \|\hat{z}_{k,1} \otimes \ldots \otimes \hat{z}_{k,d} \otimes \hat{\tilde{h}}_k\| \geq P_{min}\}| \quad (7)$$

In the operation 430, in a case where the canonical polyadic decomposition is selected, the decomposition of the tensor structure of order strictly greater than 2 into rank-1 components is executed. The polyadic decomposition of $\mathcal{T}(y)$ (where y refers to the received vector y 424) is equivalent to a separation of the received signal (i.e. the received vector y 424) into its single-user components, i.e. it enables to recover all elements of the sum ($x_{k,1}, \ldots, x_{k,d}, \sqrt{P_{kk}}$). Thus, the canonical polyadic decomposition is also referred to as unconstrained low-rank tensor decomposition. The canonical polyadic decomposition is usually less complex than the maximum likelihood decoding. The canonical polyadic decomposition decoding provides a solution of an optimization equation (8). This optimization is performed on continuous domains $\mathbb{C}^{T_1}, \ldots, \mathbb{C}^{T_d}$.

$$\left(\hat{z}_{k,1}, \ldots, \hat{z}_{k,d}, \hat{\tilde{h}}_k\right)\right)_{k=1,\ldots K_{max}} = \underset{\left(z_{k,1}\in\mathbb{C}^{T_1},\ldots,z_{k,d}\in\mathbb{C}^{T_d},h_k\in\mathbb{C}^M\right)_{k=1,\ldots K_{max}}}{\operatorname{argmin}} \left\| y - \sum_{k=1}^{K_{max}} z_{k,1} \otimes \ldots \otimes z_{k,d} \otimes h_k \right\|. \quad (8)$$

The optimization equation (8) finds the rank-$K_{max}$ tensor of dimensions $T_1 \times \ldots \times T_d \times M$ that is closest to the tensor $\mathcal{T}(y)$, where $\mathcal{T}$ is the tensorization operation described in the FIG. 2C. Optionally, in the absence of noise, for certain values of K, $T_1, \ldots, T_d$ and if $K_{max} \geq K$, the canonical polyadic decomposition can reliably separate and recover the estimated symbols from the K users up to a permutation, that is to say $\hat{x}_{\sigma(k),i} = x_{k,i}$ for any $1 \leq i \leq d$, $1 \leq k \leq K$, and where $\sigma$ is a permutation function applied on $1 \ldots K_{max}$.

At operation 432, the power thresholding associated with the canonical polyadic decomposition decoding is expressed in the following equation (9).

$$(\hat{z}_{k,1}, \ldots, \hat{z}_{k,d}) = \{(\hat{z}_{k,1}, \ldots, \hat{z}_{k,d}), 1 \leq k \leq K_{max} | \|\hat{z}_{k,1} \otimes \ldots \otimes \hat{z}_{k,d} \otimes \hat{h}_k\| \geq P_{min}\}. \quad (9)$$

The equalizer circuit 410 selects the estimated users (i.e. estimated active transmitting devices (i.e. $\hat{K}$) for the plurality of estimated symbol vectors and channel coefficients, i.e. $\hat{z}_{k,1}, \ldots, \hat{z}_{k,d}, \hat{h}_k)_{k=,\ldots,K^{max}}$ based on the power threshold ($P_{min}$).

In accordance with an embodiment, each of the decoders 426A, 426B, ..., 426K is configured to execute a de-mapping of each vector of the plurality of vectors ($\hat{z}_{k,1}, \ldots, \hat{z}_{k,d}$) associated with a first segregated symbol vector to obtain a plurality of part messages. Thereafter, each of the decoders 426A, 426B, ..., 426K is further configured to concatenate the plurality of part messages to re-construct a message having a sequence of bits (i.e. the decoded message 428A, also represented as $\hat{m}_1$). In a case where a channel coding is detected, each of the decoders 426A, 426B, ..., 426K is further configured to concatenate the plurality of part messages to obtain a sequence of coded bits. Thereafter, each of the decoders 426A, 426B, ..., 426K is further configured to decode the sequence of coded bits by use of an inverse channel code that removes redundancy from the sequence of coded bits to re-construct a message having a sequence of bits. The inverse channel code is applied when a channel coding is detected on the sequence of coded bits.

In certain scenarios, in general, an estimated vector $\hat{z}_{k,i}$ may not be a member of a sub-constellation $C_i$. In such scenarios, the estimated vector $\hat{z}_{k,i}$ is decoded based on certain computation using the following equation (10).

$$\hat{m}_{k,i}^{coded} = \mathcal{B}\left(\underset{j=1\ldots 2^{B_i}}{\operatorname{argmin}} \|\hat{z}_{k,i} - c_{j,i}\|\right) \quad (10)$$

Where, $\mathcal{B}(.)$ is an operator performing a binary representation of an integer. In an implementation, if the decoding output is an error, the decoded message is discarded. Otherwise, the decoded message $\widehat{m_k}$ is added to the list of decoded messages (i.e. the plurality of decoded messages 428A, 428B, ..., 428K).

Figure 4E:
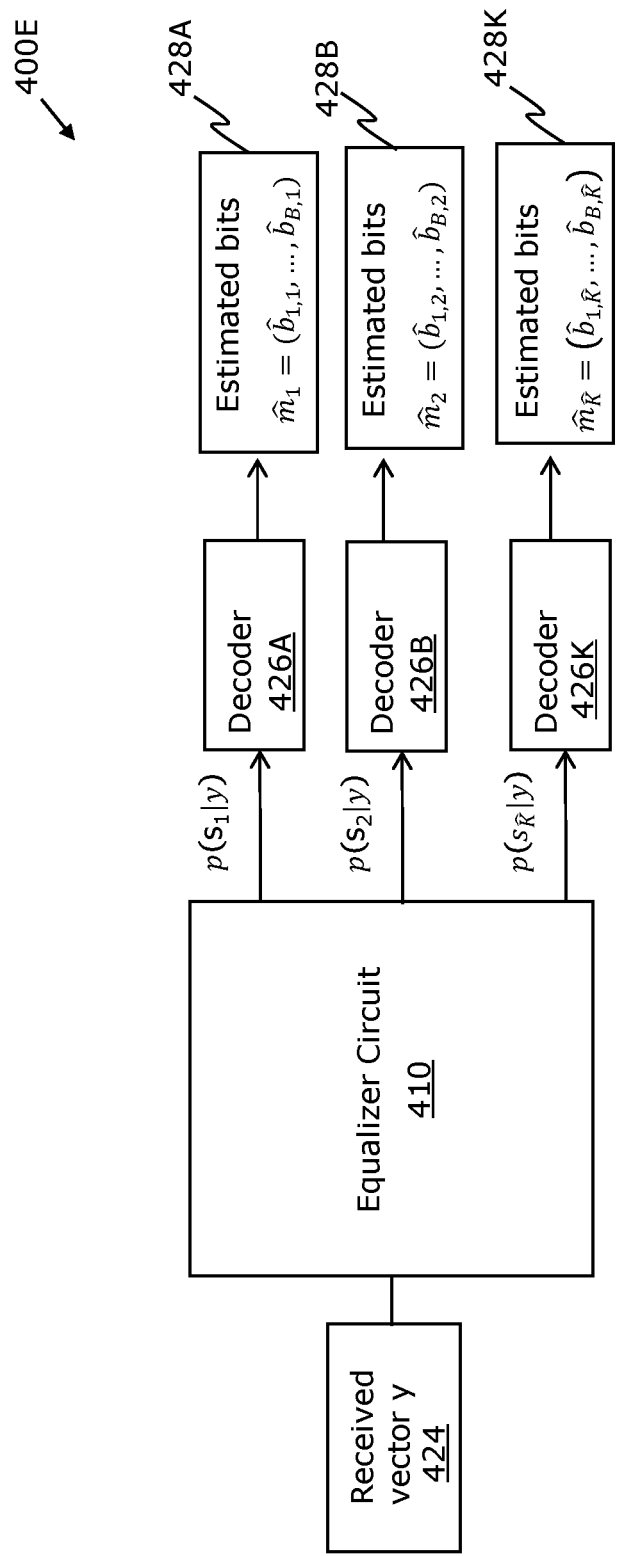
FIG. 4E is an illustration of a processing pipeline at a receiving device using a second type of decoding, in accordance with an embodiment of the present disclosure.

FIG. 4E is an illustration of a processing pipeline at a receiving device post the pre-processing operations of FIG. 4B using a second type of decoding, in accordance with an embodiment of the present disclosure. FIG. 4E is described in conjunction with elements from FIGS. 1A, 1B, 4A, and 4B. With reference to FIG. 4E, there is shown a processing pipeline 400E at the receiving device 104 using the second type of decoding. There is further shown the equalizer circuit 410, the received vector y 424, the decoders 426A, 426B, ..., 426K, and the decoded messages 428A, 428B, ..., 428K (can also be represented as estimated bits or estimated messages $\hat{m}_1, \hat{m}_2, \ldots, \hat{m}_{\hat{K}}$).

In accordance with an embodiment, the equalizer circuit 410 of the receiving device 104 is configured to execute the second type of decoding on the received vector y 424. The second type of decoding is also referred to as soft decoding. The equalizer circuit 410 is configured to execute the second type of decoding in which the equalizer circuit 410 is configured to compute a posterior distribution of each symbol vector of the plurality of symbol vectors based on prior information of a total number of the estimated plurality of symbol vectors. The posterior distribution of each symbol vector of the plurality of symbol vectors depends on a prior distribution and a likelihood function. The prior distribution relates to the information of a total number of the estimated plurality of symbol vectors. The likelihood function relates to the information in the estimated plurality of symbol vectors. In this way, the posterior distribution summarizes the information received from the estimated plurality of symbol vectors.

In accordance with an embodiment, the equalizer circuit 410 is further configured to output the posterior probability distribution (i.e. $p(s_k|y)$) over a constellation (e.g. $s_k \in C$) for the plurality of transmitting devices (i.e. $p(s_1|y)$, $p(s_2|Y), \ldots, p(s_{\hat{K}}|y)$). In this case, $\hat{K}$ is considered equal to the first parameter 434 (i.e. $\hat{K}=K_{max}$). The plurality of estimated symbol vectors (i.e. K) that corresponds to the plurality of transmitting devices is collectively denoted as a matrix S (i.e. $S=[s_1, s_2, \ldots, s_{\hat{K}}]$) of dimensions $T \times \hat{K}$. The posterior probability distribution of a given transmitting device is potentially computed as collection of a plurality of probabilities, and is represented by the following equation (equation 11).

$$p(s_k = c_j|y) \propto \sum_{s_1 \in C, \ldots s_{k-1} \in C, s_{k+1} \in C, \ldots s_{\hat{K}} \in C} p(Y|S) \quad (11)$$

Where, for all $c_j \in C$, $p(Y|S)$ is a probability density of a random quantity Y conditioned to the knowledge of S. In an example, the elements of the matrices W and H can be assumed to be Gaussian independent and identically distributed random variables. In this case, it holds $$p(Y|S) = \frac{\exp\left(tr\left(Y^H S(S^H S + \sum)^{-1} S^H Y\right)\right)}{det^M(S^H S + \sum)} \quad (12)$$

Where, $\Sigma$ is a diagonal matrix whose diagonal elements contain the noise-to-signal ratios of all $\hat{K}$ transmitting devices. Each noise-to-signal ratio is the ratio between the variance of the elements of the matrix W and the variance of the elements of $\widetilde{H}_k = \sqrt{P_k}H$.

On the basis of the posterior probability distribution, each of the decoders 426A, 426B, . . . , 426K is configured to compute a plurality of bit probabilities for every bit position (for all $1 \leq i \leq d$ and $1 \leq j \leq B_i$), which is derived from (or corresponds to) the following equation (13)

$$p(b_{k,i,j} = b|y) \propto \sum_{c_1 \in C_1, \dots, c_{i-1} \in C_{i-1}, c_i \in C_i^{j,b}, c_{i+1} \in C_{i+1}, \dots, c_d \in C_d} p(s_k = c_1 \otimes \cdots \otimes c_d | Y) \quad (13)$$

Where, either b=0 or b=1, and $C_i^{j,b}$ is a set of symbols in the constellation $C_i$ whose j-th bit is equal to b. The plurality of bit probabilities is used as input to a decoder function (such as the decoders 426A, 426B, . . . , 426K) that is defined as a reciprocal operation with respect to an encoder function (e.g. depending on the type of the channel code used in encoding side). Optionally, a structured constellation is used for $C_i$, which results in low-complexity computations of the plurality of bit probabilities. By use of the posterior probability distribution, each of the decoders 426A, 426B, . . . , 426K outputs the decoded messages 428A, 428B, . . . , 428K.

In certain scenarios, each of the plurality of transmitting devices 108 (FIG. 1B) may have multiple antennas. Alternatively stated, in a case where each of the plurality of transmitting devices 108 has N antennas with N greater than 1, then in such a case, certain operations of each of the plurality of transmitting devices 108 and the receiving device 104 is potentially adapted. For example, in an implementation, the constellation C is modified and the modified constellation is denoted as C'. The elements of the modified constellation C' are matrices of dimensions T×N. The matrices of the modified constellation C' are represented by $c_j a^T$ for all $c_j \in C$ with a as a fixed vector of size N. In this implementation, the equalizer circuit 410 and the plurality of decoders 412 remain unchanged.

In another implementation, the constellation C is modified in which the symbol vector $s_k$ transmitted by the k-th transmitting device 108k is represented as $S_k = X_{k,1} \otimes \dots \otimes X_{k,d}$, where each $X_{k,i}$ is a matrix of size $T_i \times N_i$ (for i=1 . . . d), $T_i = T_1, \dots, T_d$, and $N_i = N_1, \dots, N_d$ are such that $\Pi_{i=1}^d T_i = T$ and $\Pi_{i=1}^d N_i = N$. The sub-constellations ($X_{k,i}$ or $C_{k,i}$) is reflected in constellation $C_i$ as $C_i = \{C_{1,i}, \dots, C_{2^B,i}\}$ with each $C_{j,i}$ being a matrix of dimension $T_i \times N_i$. In this implementation, the equalizer circuit 410 provides the two solutions represented by following equations (14) and (15). Either equation (14) or equation (15) is used by the equalizer circuit 410. Each decoder of the plurality of decoders 412 performs similarly as to the case of single-antenna transmitting devices, such as the transmitting device 102.

$$\left(\hat{Z}_{k,1}, \dots, \hat{Z}_{k,d}, \hat{H}_k\right) = \underset{Z_{k,1} \in C_1, \dots, Z_{k,d} \in C_d, H_k \in \mathbb{C}^{M \times N}}{\operatorname{argmin}} \left\| Y - \sum_{k=1}^{K_{max}} (Z_{k,1} \otimes \dots \otimes Z_{k,d}) H_k^T \right\| \quad (14)$$

$$\left(\hat{Z}_{k,1}, \dots, \hat{Z}_{k,d}, \hat{H}_k\right) = \underset{Z_{k,1} \in \mathbb{C}^{T_1 \times N_1}, \dots, Z_{k,d} \in \mathbb{C}^{T_d \times N_d}, H_k \in \mathbb{C}^{M \times N}}{\operatorname{argmin}} \left\| Y - \sum_{k=1}^{K_{max}} (Z_{k,1} \otimes \dots \otimes Z_{k,d}) H_k^T \right\| \quad (15)$$

Figure 5:
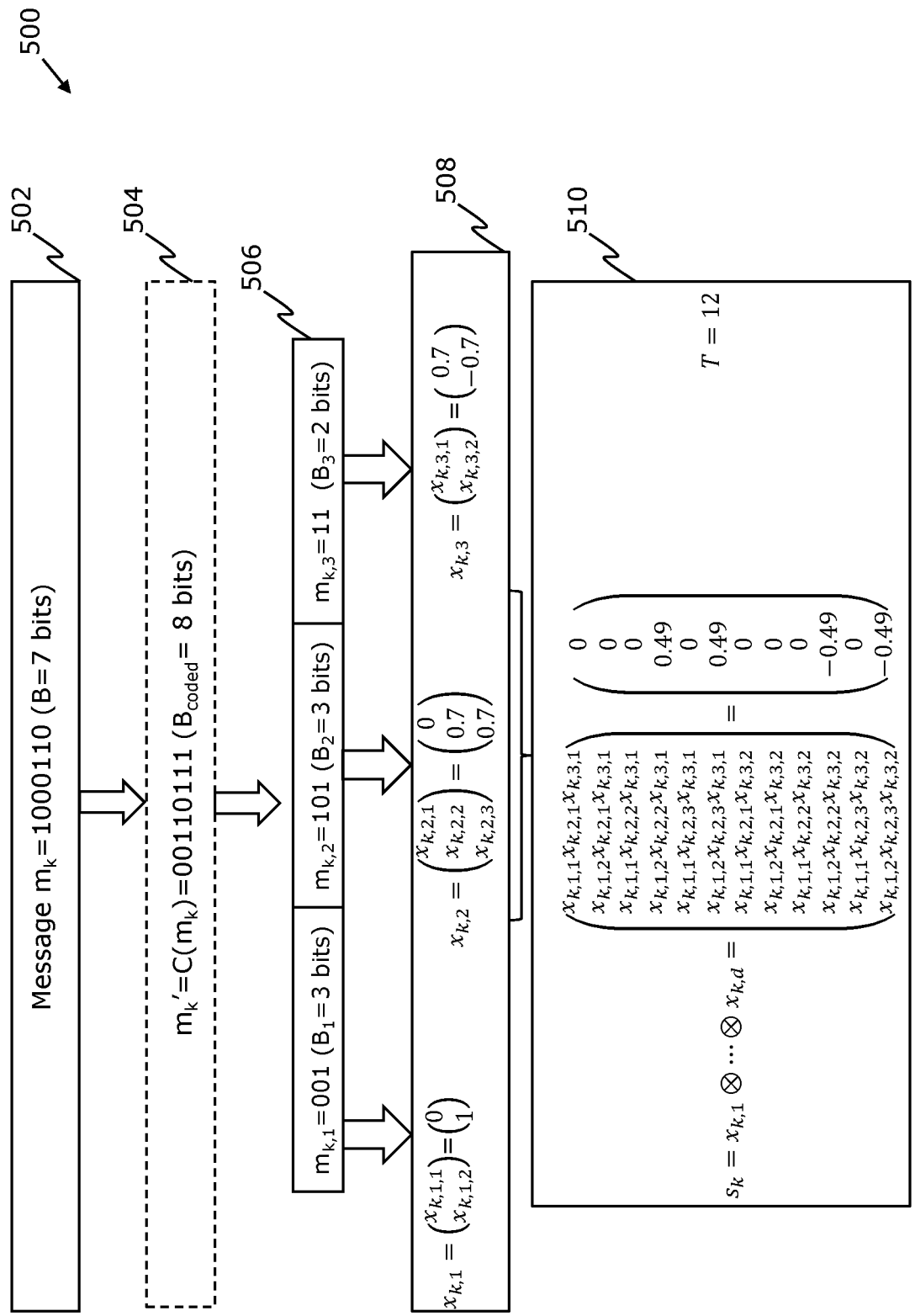
FIG. 5 is an illustration of an exemplary scenario that depicts construction of a symbol vector from an input message at a transmitting device for a random-access communication, in accordance with an embodiment of the present disclosure.

FIG. 5 is an illustration of an exemplary scenario that depicts construction of a symbol vector from an input message at a transmitting device for a random-access communication, in accordance with an embodiment of the present disclosure. FIG. 5 is described in conjunction with elements from FIGS. 1A, 1B, 2A to 2C, 3A, 3B, and 4A to 4E. With reference to FIG. 5, there is shown an exemplary scenario 500 that depicts construction of a symbol vector at the transmitting device 102.

In accordance with the exemplary scenario 500, at operation 502, the encoder 208 of the transmitting device 102 is configured to acquire an input message $m_k$ having a sequence of seven bits (i.e. $m_k$=1000110; B=7 bits) where k in the input message ($m_k$) refers to a $k^{th}$ transmitting device (e.g. the transmitting device 102).

At operation 504, the encoder 208 is further configured to encode the sequence of bits by use of a channel code (e.g. channel code C) that adds redundancy to the sequence of bits to obtain a sequence of eight coded bits (i.e. $m_k' = C(m_k) = 00110111$; $B_{coded}$=8 bits).

At operation 506, the encoder 208 is further configured to form a plurality of blocks (i.e. $m_{k,1}$, $m_{k,2}$, $m_{k,3}$) from the sequence of eight coded bits. In this case, the sequence of eight coded bits ($m_k' = C(m_k) = 00110111$) is split into 3 blocks (i.e. d=3). A first block (represented by $m_1$) has a subsequence of first 3 bits (i.e. $m_{k,i}$=001; $B_1$=3 bits) of the sequence of eight coded bits. Similarly, a second block (represented by $m_{k,2}$) has a subsequence of next 3 bits (i.e. $m_{k,2}$=101; $B_2$=3 bits) of the sequence of eight coded bits. A third block (represented by $m_{k,3}$) has a subsequence of next 2 bits (i.e. $m_{k,3}$=11; $B_3$=2 bits) of the sequence of eight coded bits. A sum of a number of bits of the subsequence (i.e. $B_1$, $B_2$, $B_3$) corresponding to each of the plurality of blocks (i.e. $m_{k,1}$, $m_{k,2}$, $m_{k,3}$) is equal to the number of $B_{coded}$ bits i.e. $B_{coded} = \Sigma_{i=1}^d B_i$. In another implementation, the plurality of blocks may be formed based on duplicating the sequence of eight coded bits.

At operation 508, the encoder 208 is further configured to determine a plurality of vectors (i.e. $x_{k,1}$, $x_{k,2}$, $x_{k,3}$) for the plurality of blocks (i.e. $m_{k,1}$, $m_{k,2}$, $m_{k,3}$). In this case, a first vector (represented by $x_{k,1}$) corresponds to the first block ($m_{k,1}$), where k in the first vector ($x_{k,1}$) refers to a $k^{th}$ transmitting device (e.g. the transmitting device 102). The first vector ($x_{k,1}$) has a vector size of 2 (i.e. $T_1$=2). The first vector ($x_{k,1}$) has one element in each dimension. For example, a first element (i.e. $x_{k,1,1}$) of the first vector ($x_{k,1}$) has a value of "0" in one dimension. A second element (i.e. $x_{k,1,2}$) of the first vector ($x_{k,1}$) has a value of "1" in second dimension. Similarly, a second vector (represented by $x_{k,2}$) corresponds to the second block ($m_{k,2}$). The second vector ($x_{k,2}$) has a vector size of 3 (i.e. $T_2=3$). The second vector ($x_{k,2}$) has an element in each dimension. For example, a first element (i.e. $x_{k,2,1}$) of the second vector ($x_{k,2}$) has a value of "0" in one dimension, a second element (i.e. $x_{k,2,3}$) of the second vector ($x_{k,2}$) has a value of "0.7" in second dimension. A third element (i.e. $x_{k,2,3}$) of the second vector ($x_{k,2}$) has a value of "0.7" in third dimension. Similarly, a third vector (represented by $x_{k,3}$) corresponds to the third block ($m_{k,3}$). The third vector ($x_{k,3}$) has a vector size of 2 (i.e. $T_3=2$). A first element (i.e. $x_{k,3,1}$) of the third vector ($x_{k,3}$) has a value of "0.7" and a second element (i.e. $x_{k,3,2}$) of the third vector ($x_{k,3}$) has a value of "−0.7". A product of the vector size of each of the plurality of vectors is equal to a number of channel uses (i.e. $\Pi_{i=1}^{d}T_i=T$). Thus, in this case, T=12 (i.e. 2*3*2=12).

At operation 510, the mapper circuit 210 of the transmitting device 102 is configured to construct a symbol vector (i.e. $s_k$) based on a Kronecker product of the plurality of vectors (i.e. $x_{k,1} \otimes x_{k,2} \otimes x_{k,3}$). The construction of symbol vector is also referred to as a constellation mapping. In the exemplary scenario 500, the Kronecker product results into a multiplication of the first element (i.e. $x_{k,1,1}$) of the first vector ($x_{k,1}$) with the first element (i.e. $x_{k,2,1}$) of the second vector ($x_{k,2}$) and with the first element (i.e. $x_{k,3,1}$) of the third vector ($x_{k,3}$). The multiplication outputs an element (i.e. $x_{k,1,1}x_{k,2,1}x_{k,3,1}$) of the symbol vector ($s_k$) having a value of "0". Similarly, the second element (i.e. $x_{k,1,2}$) of the first vector ($x_{k,1}$) is multiplied with the first element (i.e. $x_{k,2,1}$) of the second vector ($x_{k,2}$) and with the first element (i.e. $x_{k,3,1}$) of the third vector ($x_{k,3}$). The multiplication outputs an element (i.e. $x_{k,1,2}x_{k,2,1}x_{k,3,1}$) of the symbol vector ($s_k$) having a value of "0". In this way, the multiplication proceeds according to the dimensions of the plurality of vectors ($x_{k,1}$, $x_{k,2}$, $x_{k,3}$) providing a plurality of elements of the symbol vector ($s_k$) as given below. The output of the Kronecker product i.e. the Kronecker structure of the symbol vector ($s_k$) is represented via following expression (16).

$$s_k = x_{k,1} \otimes x_{k,2} \otimes x_{k,3} = \begin{pmatrix} x_{k,1,1}x_{k,2,1}x_{k,3,1} \\ x_{k,1,2}x_{k,2,1}x_{k,3,1} \\ x_{k,1,1}x_{k,2,2}x_{k,3,1} \\ x_{k,1,2}x_{k,2,2}x_{k,3,1} \\ x_{k,1,1}x_{k,2,3}x_{k,3,1} \\ x_{k,1,2}x_{k,2,3}x_{k,3,1} \\ x_{k,1,1}x_{k,2,1}x_{k,3,2} \\ x_{k,1,2}x_{k,2,1}x_{k,3,2} \\ x_{k,1,1}x_{k,2,2}x_{k,3,2} \\ x_{k,1,2}x_{k,2,2}x_{k,3,2} \\ x_{k,1,1}x_{k,2,3}x_{k,3,2} \\ x_{k,1,2}x_{k,2,3}x_{k,3,2} \end{pmatrix} = \begin{pmatrix} 0 \\ 0 \\ 0 \\ 0.49 \\ 0 \\ 0.49 \\ 0 \\ 0 \\ 0 \\ -0.49 \\ 0 \\ -0.49 \end{pmatrix} \quad (16)$$

The size of the symbol vector (i.e. T=12) is equal to the product of the vector size of each of the plurality of vectors (i.e. $T=T_1T_2T_3$ ($T_1=2$, $T_2=3$, $T_3=2$)). The number of modes of the tensor represented by the symbol vector $s_k$ is d=3.

Figure 6A:
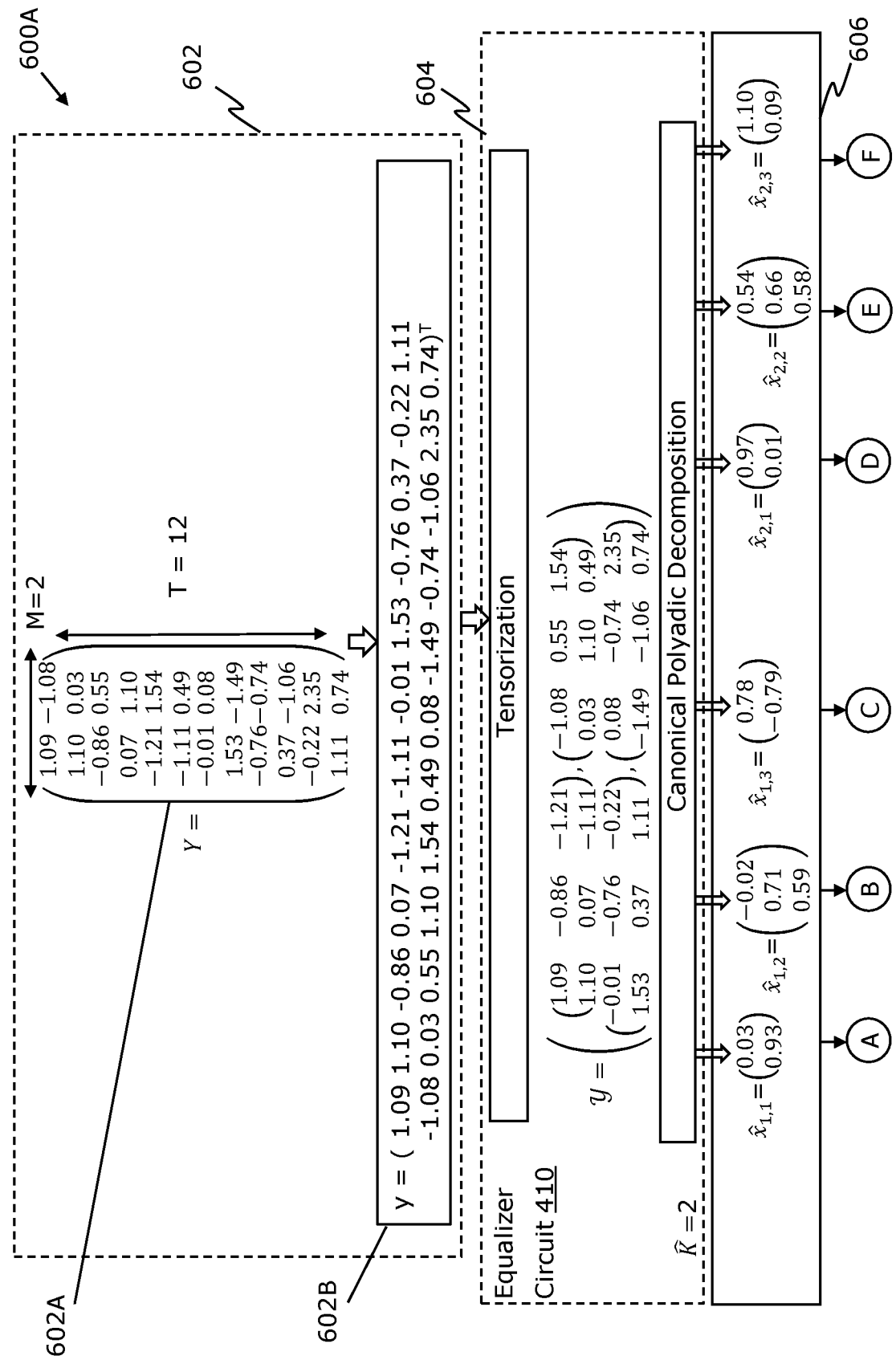
FIGS. 6A and 6B collectively, are illustrations of an exemplary scenario that depicts exemplary processing at a receiving device to recover transmitted messages for a random-access communication, in accordance with an embodiment of the present disclosure.
Figure 6B:
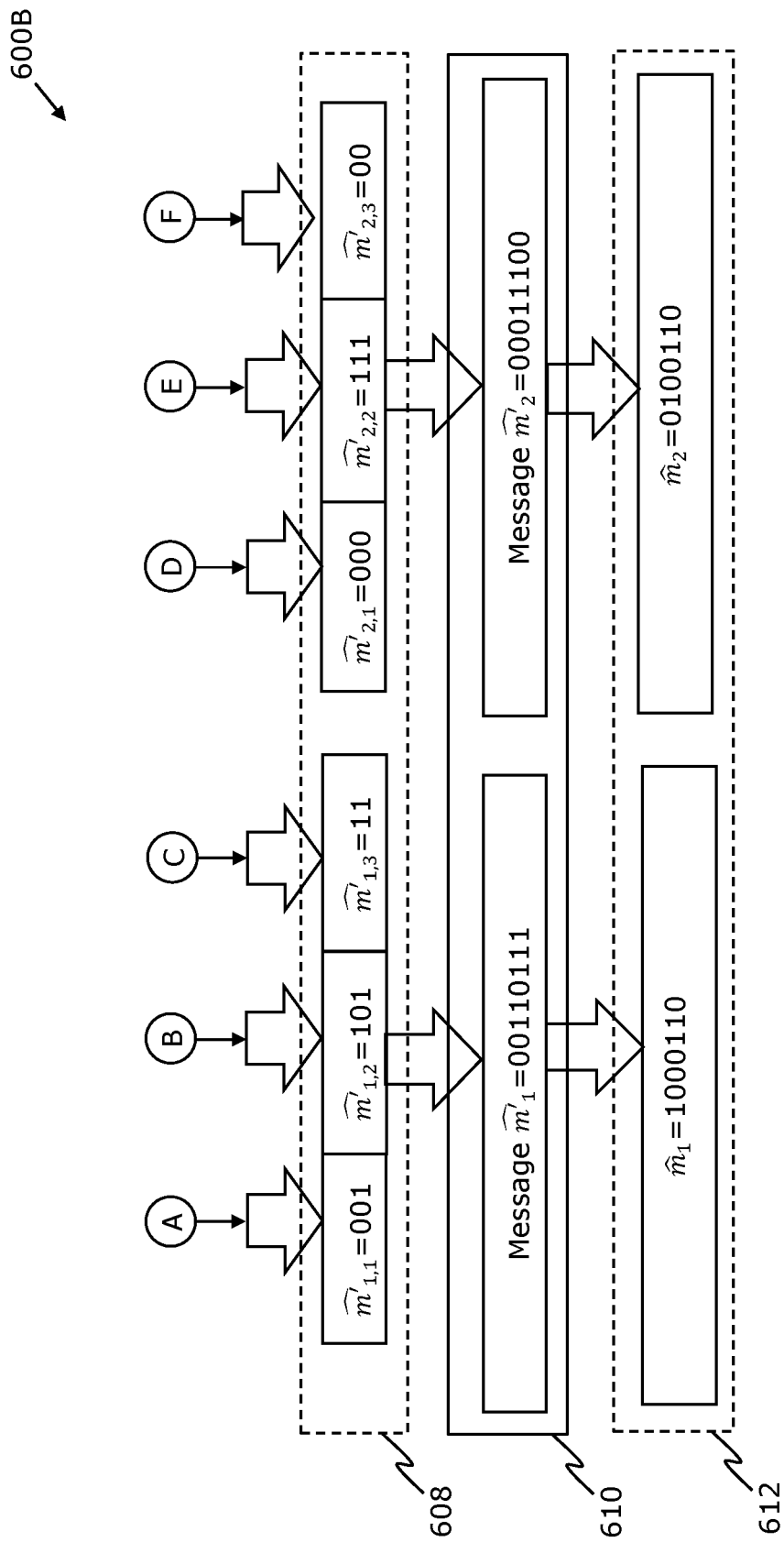

FIGS. 6A and 6B, collectively are illustrations of an exemplary scenario that depicts exemplary processing at a receiving device to recover transmitted message associated with a plurality of transmitting devices for a random-access communication, in accordance with an embodiment of the present disclosure. FIGS. 6A and 6B are described in conjunction with elements from FIGS. 1A, 1B, 2A to 2C, 3A, 3B, 4A to 4E, and 5. With reference to FIG. 6A, there is shown an exemplary scenario 600A that depicts estimation of a plurality of sub-constellations at the receiving device 104.

In accordance with the exemplary scenario 600A, at operation 602, two receiving antennas (i.e. M=2) of the receiving device 104 concurrently receives two radio frequency signals. The pre-processing circuit 408 of the receiving device 104 executes pre-processing operations, such as demodulation of each of the two received radio frequency signals, conversion of the demodulated signals in analog domain to a digital domain, followed by resource demapping, in which symbol synchronization and slicing is performed to generate a first received signal (i.e. a matrix Y 602A) using equation (2) of FIG. 1B. The matrix Y 602A is a T×M matrix, where T=12 and M=2, and where T=12 is equal to the number of channel uses (i.e. 12 channel uses). In the matrix Y 602A, each column space corresponds to each of two receiving antennas M. The first received signal (i.e. the matrix Y 602A) is then vectorized using the vectorization operation to generate a second received signal (i.e. the received vector y 602B using equation 3), which is the output signal of the pre-processing circuit 408.

At operation 604, the equalizer circuit 410 of the receiving device 104 is configured to initiate the first type of decoding. The received vector y 602B is tensorized to obtain a tensor (i.e. $\mathcal{Y}$) that is represented in the following mathematical expression (17).

$$\mathcal{Y} = \begin{pmatrix} \begin{pmatrix} 1.09 & -0.86 & -1.21 \\ 1.10 & 0.07 & -1.11 \end{pmatrix}, \begin{pmatrix} -1.08 & 0.55 & 1.54 \\ 0.03 & 1.10 & 0.49 \end{pmatrix} \\ \begin{pmatrix} -0.01 & -0.76 & -0.22 \\ 1.53 & 0.37 & 1.11 \end{pmatrix}, \begin{pmatrix} 0.08 & -0.74 & 2.35 \\ -1.49 & -1.06 & 0.74 \end{pmatrix} \end{pmatrix} \quad (17)$$

The tensor ($\mathcal{Y}$) is represented as a block matrix with dimensions of $T_3 \times M$. The tensor ($\mathcal{Y}$) has four blocks with each block having a number of entries that is computed as $T_1 \times T_2$ (in this case, $T_1=2$, $T_2=3$, $T_3=2$). The tensor has order greater than 2 (order 3 or d=3 in this case).

At operation 606, the equalizer circuit 410 is further configured to execute a canonical polyadic decomposition on the tensor (e.g. the tensor $\mathcal{Y}$)) to estimate a plurality of vectors. The equalizer circuit 410 is configured to utilize a first parameter (i.e. $K_{max}$) that represents a maximum possible number of a plurality of decoded messages to estimate a number of active transmitters. In this exemplary scenario 600A, two active transmitting devices are estimated (i.e. $\hat{K}=2$). Each active transmitting device has its own set of the estimated plurality of vectors. A first set of vectors of the estimated plurality of vectors (i.e. $\hat{z}_{1,1}$, $\hat{z}_{1,2}$, $\hat{z}_{1,3}$) corresponds to a first active transmitting device (i.e. the transmitting device 102) and a second set of vectors of the estimated plurality of vectors (i.e. $\hat{z}_{2,1}$, $\hat{z}_{2,2}$, $\hat{z}_{2,3}$) corresponds to a second active transmitting device. In the exemplary scenario 600A, an estimated vector from the first set of the estimated plurality of vector (i.e. $\hat{z}_{1,1}$) has two dimensions with one element in each dimension that is represented as $$\hat{z}_{1,1} = \begin{pmatrix} 0.03 \\ 0.93 \end{pmatrix}.$$

Similarly, another estimated vector (i.e. $\hat{z}_{1,2}$) has three dimensions with one element in each dimension that is represented as $$\hat{z}_{1,2} = \begin{pmatrix} -0.02 \\ 0.71 \\ 0.59 \end{pmatrix}.$$

An another estimated vector (i.e. $\hat{z}_{1,3}$) has two dimensions with one element in each dimension that is represented as $$\hat{z}_{1,3} = \begin{pmatrix} 0.78 \\ -0.79 \end{pmatrix}.$$

Similarly, the second set of vectors is represented as $\hat{z}_{2,1}\hat{z}_{2,2}$, $\hat{z}_{2,3}$ along with its respective elements.

With reference to FIG. 6B, at operation 608, each decoder (e.g. a single-user decoder) of the plurality of decoders 412 is configured to execute a de-mapping of each vector of the estimated plurality of vectors to obtain a plurality of part messages. The plurality of part messages that corresponds to the first active transmitting device is represented as $\widehat{m'}_{1,1}$, $\widehat{m'}_{1,2}$, $\widehat{m'}_{1,3}$. Similarly, the plurality of part messages that corresponds to the second active transmitting device is represented as $\widehat{m'}_{2,1}$, $\widehat{m'}_{2,2}$, $\widehat{m'}_{2,3}$. Each part message of the plurality of part messages has a sub-sequence of bits. The sub-sequence of bits of each part message of the plurality of part messages is same as the sub-sequence of bits corresponding to the plurality of blocks (i.e. $m'_{1,1}$, $m'_{1,2}$, $m'_{1,3}$ and $m'_{2,1}$, $m'_{2,2}$, $m'_{2,3}$ respectively) at operation 506 of the exemplary scenario 500.

At operation 610, each decoder of the plurality of decoders 412 is configured to concatenate the plurality of part messages to obtain a sequence of coded bits. The sequence of coded bits that corresponds to the first active transmitting device (i.e. $\widehat{m'}_1$=00110111) is same as the sequence of eight coded bits (i.e. $m_1'$=C($m_1$)=00110111). The sequence of coded bits that corresponds to the second active transmitting device is $\widehat{m'}_2$=0001110.

At operation 612, each decoder of the plurality of decoders 412 is configured to decode the sequence of coded bits by use of an inverse channel code that removes redundancy from the sequence of coded bits to re-construct a message having a sequence of bits. The inverse channel code is applied when a channel coding is detected on the sequence of coded bits. The re-constructed message (i.e. a first decoded message) has a sequence of bits (i.e. $\hat{m}_1$=1000110) for the first active transmitting device is same as the input message m having the sequence of bits (i.e. $m_1$=1000110). Another re-constructed message (i.e. a second decoded message) has a sequence of bits (i.e. $\hat{m}_2$=0100110) that corresponds to the second active transmitting device.

Figure 7:
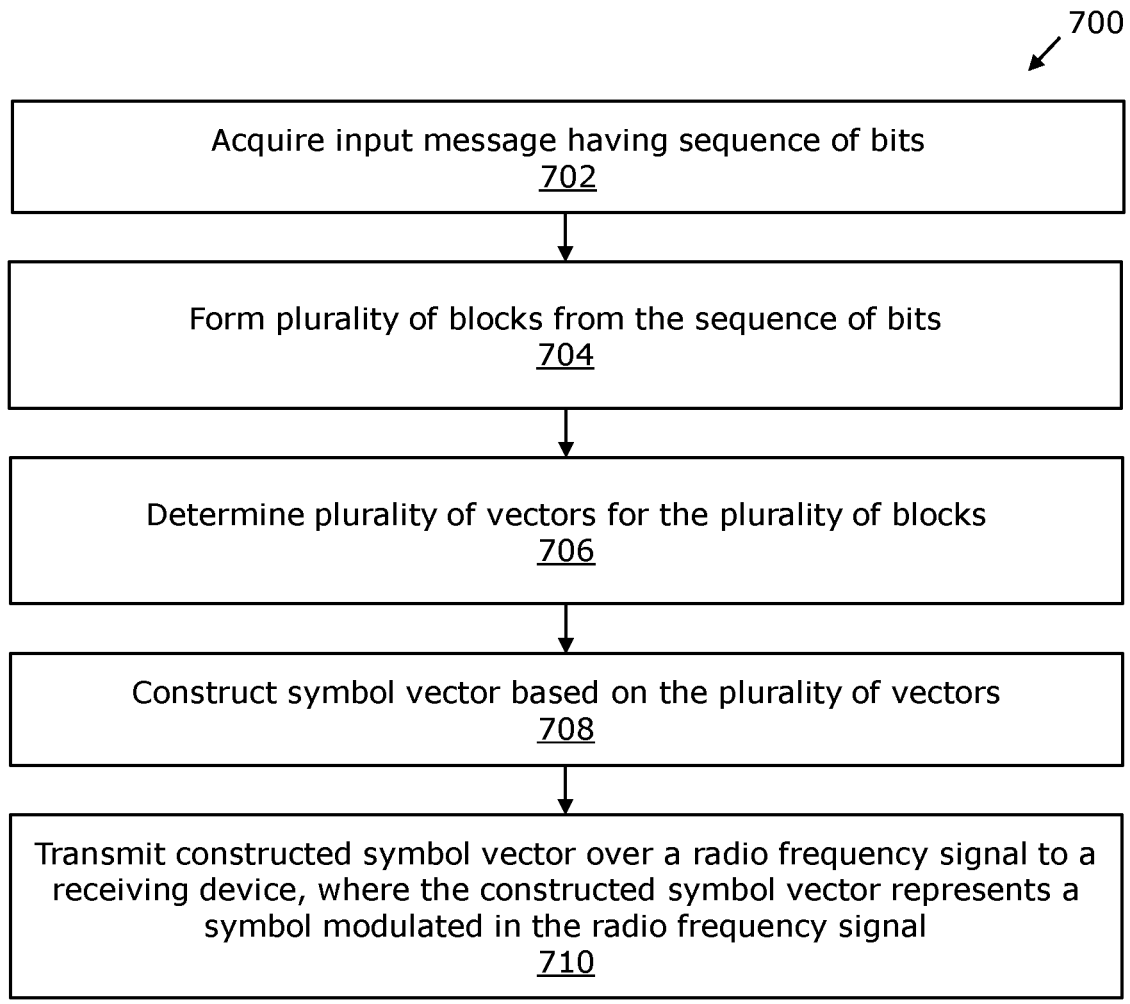
FIG. 7 is a flowchart of a method for a random-access communication at a transmitting device, in accordance with an embodiment of the present disclosure.

FIG. 7 is a flowchart of a method 700 for a random-access communication, in accordance with an embodiment of the present disclosure. The method 700 is executed by the transmitting device 102. The method 700 includes steps 702 to 710.

At step 702, an input message having a sequence of bits is acquired. The encoder 208 of the transmitting device 102 is configured to acquire the input message. An example of the acquisition of the input message has been described in detail, for example, in FIGS. 1A, 2B, and 3A.

At step 704, a plurality of blocks is formed from the sequence of bits. The encoder 208 is further configured to form the plurality of blocks based on splitting or duplication of the sequence of bits. An example of the forming of the plurality of blocks has been described in detail, for example, in FIGS. 1A and 3A.

At step 706, a plurality of vectors is determined for the plurality of blocks. The encoder 208 is further configured to determine the plurality of vectors for the plurality of blocks. An example of the determination of the plurality of vectors is described has been detail, for example, in FIGS. 1A and 3A.

At step 708, a symbol vector is constructed based on the plurality of vectors. The mapper circuit 210 is configured to construct the symbol vector based on the plurality of vectors. The symbol vector is constructed based on at least one Kronecker product (or a plurality of Kronecker products) of the plurality of vectors. An example of the construction of the symbol vector has been described in detail, for example, in FIGS. 1A, 2B, and 3A.

At step 710, the constructed symbol vector is transmitted over a radio frequency signal by the transmitting device 102 to the receiving device 104. The constructed symbol vector represents a symbol modulated in the radio frequency signal. The antenna 206 is configured to transmit the constructed symbol vector over the radio frequency signal. An example of the construction of the symbol vector has been described in detail, for example, in FIGS. 1A and 2B.

In accordance with an embodiment, the method 700 further comprises encoding the sequence of bits by use of a channel code that adds redundancy to the sequence of bits to obtain a sequence of coded bits, where the plurality of blocks are formed from the sequence of coded bits when the sequence of bits are encoded by the channel code. The encoding the sequence of bits by use of the channel code has been described in detail, for example, in FIGS. 1A, 3B, and 5.

In accordance with an embodiment, the method 700 further comprises determining one-to-one correspondence between each element of the tensor structure of the symbol vector having two or more modes and a corresponding signal frequency in order to modulate the symbol vector in the radio frequency signal. Such determining of the one-to-one correspondence has been described in detail, for example, in FIGS. 1A, 2A, 2B, and 2C.

The steps 702 to 710 are only illustrative and other alternatives can also be provided where one or more steps are added, one or more steps are removed, or one or more steps are provided in a different sequence without departing from the scope of the claims herein.

In one aspect, a computer program product is provided comprising a non-transitory computer-readable storage medium having computer program code stored thereon, the computer program code being executable by a processor to execute the method 700. Examples of implementation of the non-transitory computer-readable storage medium is same as of the memory 204. Examples of the processor is same as of the control circuitry 202.

Figure 8:
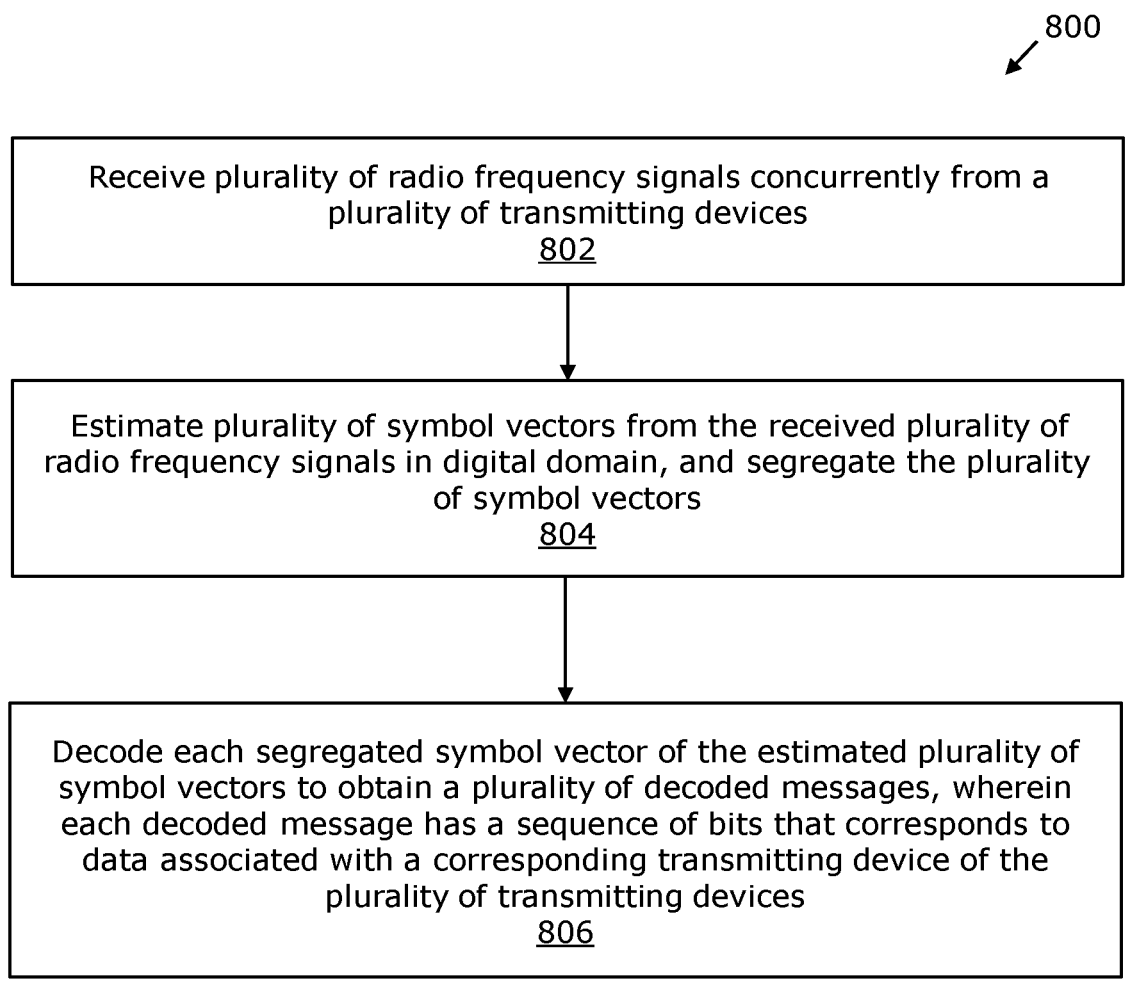
FIG. 8 is a flowchart of a method for a random-access communication at a receiving device, in accordance with an embodiment of the present disclosure.

FIG. 8 is a flowchart of a method 800 for a random-access communication, in accordance with an embodiment of the present disclosure. The method 800 is executed by the receiving device 104. The method 800 includes steps 802, 804, and 806.

At step 802, a plurality of radio frequency signals is concurrently received from a plurality of transmitting devices (e.g. the plurality of transmitting devices 108). At least one antenna 402 of the receiving device 104 is configured to receive the plurality of radio frequency signals concurrently from the plurality of transmitting devices 108. An example of the receipt of the plurality of radio frequency signals has been described in detail, for example, in FIGS. 1B, 4A, and 4B.

At step 804, a plurality of symbol vectors is estimated from the received plurality of radio frequency signals in digital domain. Further, the plurality of symbol vectors is segregated. The estimation of the plurality of symbol vectors has been described in detail, for example, in FIGS. 1B, 4A, 4C, and 4D.

At step 806, each segregated symbol vector of the estimated plurality of symbol vectors is decoded to obtain a plurality of decoded messages. Each decoded message has a sequence of bits that corresponds to data associated with a corresponding transmitting device of the plurality of transmitting devices (e.g. the plurality of transmitting devices 108). An example of the decoding to obtain the plurality of decoded messages has been described in detail, for example, in FIGS. 1B, 4A, 4C, 4D, 4E, 6A, and 6B.

In accordance with an embodiment, the method 800 further comprises executing, by the receiving device 104, a first type of decoding in which a first parameter that represents a maximum possible number of the plurality of decoded messages is utilized to estimate a number of active transmitting devices. The method 800 further comprises executing, by the receiving device 104, the first type of decoding based on a maximum likelihood decoding or a canonical polyadic decomposition. An example of the first type of decoding has been described in detail, for example, in FIGS. 1B, 4C, 4D, 6A, and 6B.

In accordance with an embodiment, the method 800 further comprises utilizing, by the receiving device 104, a second parameter that represents a power threshold, where the power threshold is used to discard a subset of the estimated plurality of symbol vectors. An example of the use of the second parameter has been described in detail, for example, in FIGS. 1B and 4D.

In accordance with an embodiment, the method 800 further comprises executing, by the receiving device 104, a de-mapping of each vector of the plurality of vectors associated with the first segregated symbol vector to obtain a plurality of part messages. The method 800 further comprises concatenating, by the receiving device 104, the plurality of part messages to re-construct a message having a sequence of bits. An example of the de-mapping of each vector of the plurality of vectors and concatenation has been described in detail, for example, in FIGS. 1B, 4A, 4C, 4D, 6A, and 6B.

In accordance with an embodiment, the method 800 further comprises concatenating, by the receiving device 104, the plurality of part messages to obtain a sequence of coded bits. The method 800 further comprises decoding, by the receiving device 104, the sequence of coded bits by use of an inverse channel code that removes redundancy from the sequence of coded bits to re-construct a message having a sequence of bits, wherein the inverse channel code is applied when a channel coding is detected on the sequence of coded bits. An example of the concatenation, decoding by inverse channel code has been described in detail, for example, in FIGS. 1B, 4A, 4C, 4D, 6A, and 6B.

In accordance with an embodiment, the method 800 further comprises executing, by the receiving device 104, a second type of decoding in which the equalizer circuit 410 is configured to compute a posterior distribution of each symbol vector of the plurality of symbol vectors based on prior information of a total number of the estimated plurality of symbol vectors. An example of the second type of decoding has been described in detail, for example, in FIGS. 4A and 4E.

The steps 802, 804, and 806 are only illustrative and other alternatives can also be provided where one or more steps are added, one or more steps are removed, or one or more steps are provided in a different sequence without departing from the scope of the claims herein.

In another aspect, a computer program product is provided comprising a non-transitory computer-readable storage medium having computer program code stored thereon, the computer program code being executable by a processor to execute the method 800. Examples of implementation of the non-transitory computer-readable storage medium is same as of the memory 204 or the memory 406. Examples of the processor is same as of the control circuitry 404.

Figure 9:
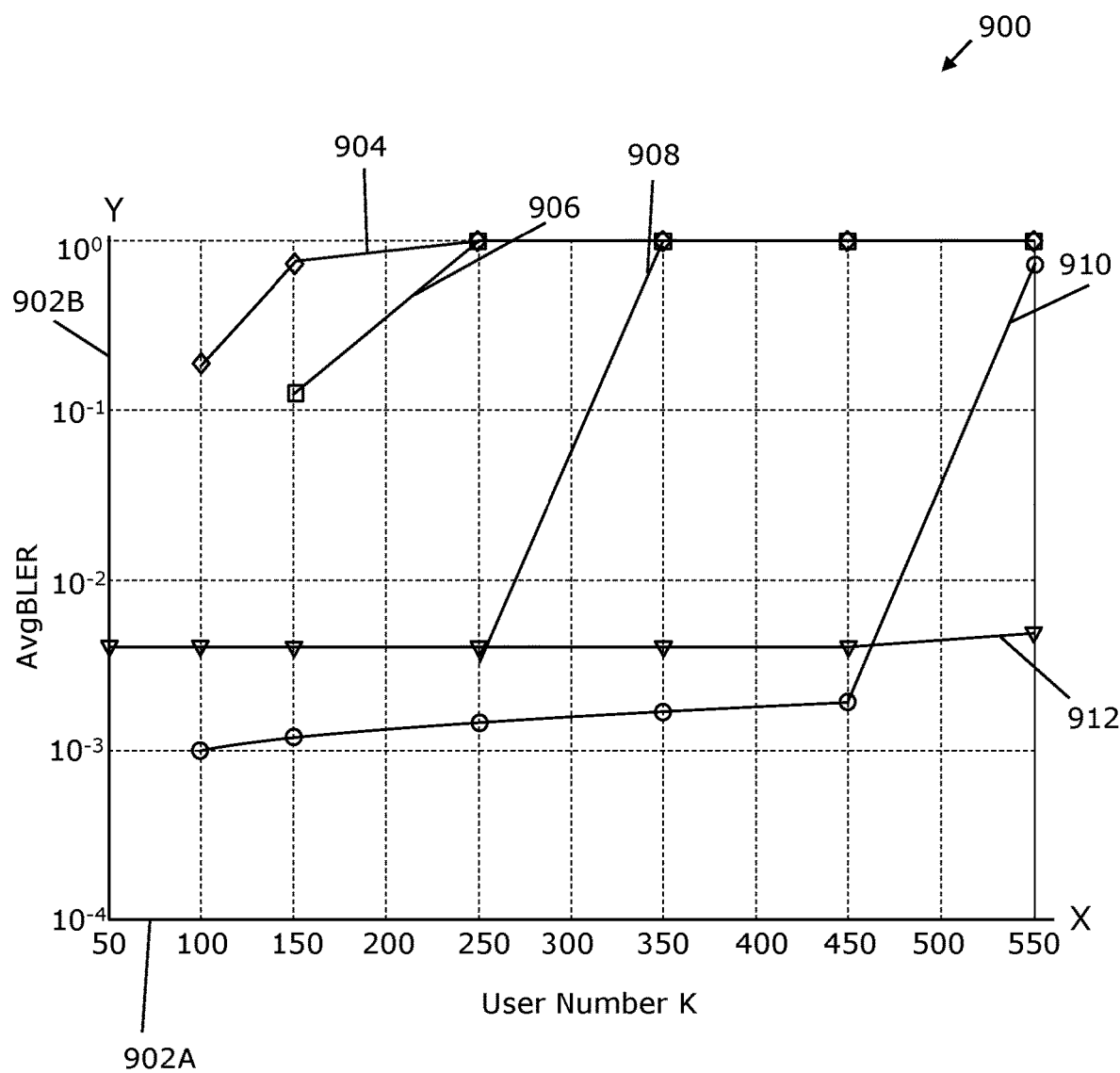
FIG. 9 is a graphical representation that illustrates comparative results of different waveform design methods, in accordance with an embodiment of the present disclosure.

FIG. 9 is a graphical representation that illustrates comparative results of different signal construction methods, in accordance with an embodiment of the present disclosure. FIG. 9 is described in conjunction with elements from FIGS. TA, 1B, 2A-2C, 3A, 3B, 4A-4E, 5, 6A, 6B, 7, and 8. With reference to FIG. 9, there is shown a graphical representation 900 with an X-axis 902A that represents number of users K and a Y-axis 902B that represents an average error probability in average block error rate (AvgBLER). The number of users corresponds to number of transmitting devices K.

In the graphical representation 900, a first line 904 represents measurements of average error probability with the number of users in a system when a waveform is designed by using a known method (i.e. a SPArse Regression Codes (SPARCs)-based conventional method, such as using SPARCs L=32). A second line 906 represents measurements of average error probability with the number of users in the same system when a waveform is designed by using another known method (e.g. Time Division Multiple Access (TDMA)-based conventional method, such as such as using codebook TDMA).

In the graphical representation 900, a third line 908 represents measurements of average error probability with the number of users in the same system when waveform is designed by using the Kronecker structure with a tensor decomposition I (where d=2, $T_i$=64, $T_2$=50). A fourth line 910 represents measurements of average error probability with respect to the number of users in the same system when waveform is designed by using the Kronecker structure with a tensor decomposition II (where d=3, $T_1$=20, $T_2$=16, $T_3$=10). Similarly, a fifth line 912 represents measurements of average error probability with respect to the number of users in the same system when waveform is designed by using the Kronecker structure with a tensor decomposition III (where d=5, $T_1$=8, $T_2$=5, $T_3$=5, $T_4$=4, $T_5$=4).

In an example, the aforementioned system corresponds to the system 100B of FIG. 1B. The system used for experimental testing and measurements included K number of transmitting devices (each transmitting device had N=1 antenna), which transmitted a sequence of B=96 bits within T=3200 channel uses, powers coefficients were equal to $P_1$= . . . =$P_K$=1, elements of H were from a complex Gaussian distribution of variance 1, elements of W were from a complex Gaussian distribution of variance $10^{1.5}$, sub-constellation selected was the Grassmannian cube-split constellation, and with number of active users (i.e. $K_{max}$=K and $P_{min}$=0), and three different tensor decompositions were used with the following parameters.

d=2, $T_1$=64, $T_2$=50 with $B_1$=48, $B_2$=48
d=3, $T_1$=20,$T_2$=16, $T_3$=10 with $B_1$=32, $B_2$=32,$B_3$=32
d=5, $T_1$=8,$T_2$=5,$T_3$=5,7$T_4$=4,7$T_5$=4 with $B_1$=20,$B_2$=19, $B_3$=19,$B_4$=19, $B_5$=19)

In the system that was used for experimental testing, the average error probability of mismatch between a list of decoded messages obtained at the receiving device side and the list of transmitted messages sent by a transmitting device, was used as error metric. Alternatively stated, the proportion of messages in the list of decoded messages that have not been transmitted summed up with the proportion of messages that are not in the list of decoded messages and have been transmitted, was calculated. The receiving device used was similar to that of the receiving device 104 of FIG. 1B which had M=50 antennas. As shown in the FIG. 9, it was observed that the average error probability was high for the conventional methods (i.e. SPARCs and TDMA based methods (represented by the first line 904 and the second line 906), whereas the average error probability was significantly less for the tensor decomposition I, II and III (represented by the third line 908, the fourth line 910, and the fifth line 912) for the same number of users (i.e. approximately 50 to 250 users. The tensor decomposition I, II and III, corresponds to the tensor structure (specifically, the Kronecker structure) used for symbol vector construction and waveform design as described in the present disclosure). Moreover, it was further observed that as the tensor-based constellation (i.e. the symbol vector construction) can support up to 550 users while achieving an error probability lower than 102, thereby significantly improving the state of the art. Moreover, conventional methods are found to support only a smaller number of users (e.g. about 100 users with acceptable error probability) and where the error probability increases and become unacceptable as the number of users increases. In contradiction to conventional systems, as shown, the tensor decomposition III can support up to 500-550 users achieving an average error probability lower than $10^{-2}$. The tensor-based constellation (i.e. symbol vector construction using the Kronecker product) also allows to further increase the number of users (greater than 500) by modifying the parameters d and $T_1, \ldots, T_d$.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. A transmitting device for a random-access communication, comprising:
an encoder that is configured to:
acquire an input message having a sequence of bits;
form a plurality of blocks from the sequence of bits; and
determine a plurality of vectors for the plurality of blocks;
a mapper circuit that is configured to construct a symbol vector based on the plurality of vectors, wherein the plurality of vectors correspond to a plurality of sub-constellations and the symbol vector corresponds to a constellation, and the constellation is a cartesian product of the plurality of sub-constellations, and wherein a product of a vector size of each of the plurality of vectors is equal to a number of channel uses; and
an antenna that is configured to transmit the constructed symbol vector over a radio frequency (RF) signal to a receiving device, wherein the constructed symbol vector represents a symbol modulated in the RF signal.

2. The transmitting device according to claim 1, wherein the symbol vector is constructed based on at least one Kronecker product of the plurality of vectors.

3. The transmitting device according to claim 1, wherein the encoder is further configured to encode the sequence of bits by using a channel code that adds redundancy to the sequence of bits to obtain a sequence of coded bits, wherein the plurality of blocks are formed from the sequence of coded bits when the sequence of bits are encoded by the channel code.

4. The transmitting device according to claim 1, wherein each of the plurality of sub-constellations has a structure selected from at least one of: a Grassmannian constellation, a cube-split constellation, a canonical basis, a single-element codebook or a constellation wherein each of the plurality of vectors is divided to a pilot part and a data part.

5. The transmitting device according to claim 1, wherein the symbol vector has at least one of a rank 1 tensor structure, a rank-n tensor structure or a rank-K tensor structure, and wherein the mapper circuit is further configured to determine a one-to-one correspondence between each element of the tensor structure of the symbol vector having two or more modes and a corresponding signal frequency in order to modulate the symbol vector in the RF signal.

6. A receiving device for a random-access communication, comprising:
at least one antenna configured to receive a plurality of radio frequency signals concurrently from a plurality of transmitting devices:
an equalizer circuit that is configured to estimate a plurality of symbol vectors from the received plurality of radio frequency signals in digital domain, and segregate the plurality of symbol vectors; and
a plurality of decoders, wherein each of the plurality of decoders is configured to decode one segregated symbol vector of the estimated plurality of symbol vectors to obtain a plurality of decoded messages, wherein each decoded message has a sequence of bits that corresponds to data associated with a corresponding transmitting device of the plurality of transmitting devices, wherein the symbol vector is constructed from a plurality of sub-vectors, the plurality of sub-vectors correspond to a plurality of sub-constellations and the symbol vector corresponds to a constellation, and the constellation is a cartesian product of the plurality of sub-constellations, and wherein a product of a vector size of each of the plurality of sub-vectors is equal to a number of channel uses.

7. The receiving device according to claim 6, wherein the equalizer circuit is a non-coherent equalizer in which a channel state information is unknown when the plurality of symbol vectors are estimated.

8. The receiving device according to claim 6, wherein the equalizer circuit is configured to execute a first type of decoding in which the equalizer circuit is configured to:
utilize a first parameter that represents a maximum possible number of the plurality of decoded messages to estimate a number of active transmitting devices; and
execute the first type of decoding based on a maximum likelihood decoding or a canonical polyadic decomposition.

9. The receiving device according to claim 8, wherein the equalizer circuit is further configured to utilize a second parameter that represents a power threshold, wherein the power threshold is used to discard a subset of the estimated plurality of symbol vectors.

10. The receiving device according to claim 6, wherein at least one decoder of the plurality of decoders is further configured to execute a de-mapping of each vector of the plurality of symbol vectors associated with a first segregated symbol vector to obtain a plurality of part messages.

11. The receiving device according to claim 10, wherein the at least one decoder of the plurality of decoders is further configured to concatenate the plurality of part messages to re-construct a message having a sequence of bits.

12. The receiving device according to claim 10, wherein the at least one decoder of the plurality of decoders is further configured to:
concatenate the plurality of part messages to obtain a sequence of coded bits; and
decode the sequence of coded bits by use of an inverse channel code that removes redundancy from the sequence of coded bits to re-construct a message having a sequence of bits, wherein the inverse channel code is applied when a channel coding is detected on the sequence of coded bits.

13. A method for a random-access communication, comprising:
acquiring, by an encoder of a transmitting device, an input message having a sequence of bits;
forming, by the encoder of the transmitting device, a plurality of blocks from the sequence of bits; and
determining, by the encoder of the transmitting device, a plurality of vectors for the plurality of blocks;
constructing, by the transmitting device, a symbol vector based on the plurality of vectors, wherein the plurality of vectors correspond to a plurality of sub-constellations and the symbol vector corresponds to a constellation, and the constellation is a cartesian product of the plurality of sub-constellations, and wherein a product of a vector size of each of the plurality of vectors is equal to a number of channel uses; and
transmitting, by the transmitting device, the constructed symbol vector over a radio frequency (RF) signal to a receiving device, wherein the constructed symbol vector represents a symbol modulated in the RF signal.

14. The method according to claim 13, wherein the symbol vector is constructed based on at least one Kronecker product of the plurality of vectors.

15. The method according to claim 13, wherein the forming, by the encoder of the transmitting device, a plurality of blocks from the sequence of bits comprises: encoding the sequence of bits by using a channel code that adds redundancy to the sequence of bits to obtain a sequence of coded bits, wherein the plurality of blocks are formed from the sequence of coded bits when the sequence of bits are encoded by the channel code.

16. The method according to claim 13, wherein each of the plurality of sub-constellations has a structure selected from at least one of: a Grassmannian constellation, a cube-split constellation, a canonical basis, a single-element codebook or a constellation wherein each of the plurality of vectors is divided to a pilot part and a data part.

17. The method according to claim 13, wherein the symbol vector has at least one of a rank 1 tensor structure, a rank-n tensor structure or a rank-K tensor structure, and wherein the method further comprises: determining a one-to-one correspondence between each element of the tensor structure of the symbol vector having two or more modes and a corresponding signal frequency in order to modulate the symbol vector in the RF signal.

18. A method for a random-access communication, comprising:
receiving, by a receiving device, a plurality of radio frequency signals concurrently from a plurality of transmitting devices;
estimating, by the receiving device, a plurality of symbol vectors from the received plurality of radio frequency signals in digital domain, and segregate the plurality of symbol vectors; and
decoding, by the receiving device, each segregated symbol vector of the estimated plurality of symbol vectors to obtain a plurality of decoded messages, wherein each decoded message has a sequence of bits that corresponds to data associated with a corresponding transmitting device of the plurality of transmitting devices, wherein the symbol vector is constructed from a plurality of sub-vectors, the plurality of sub-vectors correspond to a plurality of sub-constellations and the symbol vector corresponds to a constellation, and the constellation is a cartesian product of the plurality of sub-constellations, and wherein a product of a vector size of each of the plurality of sub-vectors is equal to a number of channel uses.

19. The method according to claim 18, further comprising:
utilizing a first parameter that represents a maximum possible number of the plurality of decoded messages to estimate a number of active transmitting devices; and
executing a first type of decoding based on a maximum likelihood decoding or a canonical polyadic decomposition.

20. The method according to claim 19, further comprising: utilizing a second parameter that represents a power threshold, wherein the power threshold is used to discard a subset of the estimated plurality of symbol vectors.

* * * * *

UNITED STATES PATENT AND TRADEMARK OFFICE
CERTIFICATE OF CORRECTION

Page 1 of 1

PATENT NO. : 12,342,385 B2
APPLICATION NO. : 17/899243
DATED : June 24, 2025
INVENTOR(S) : Alexis Decurninge and Maxime Guillaud It is certified that error appears in the above-identified patent and that said Letters Patent is hereby corrected as shown below:

In the Claims

In Column 36, In Line 44, In Claim 6, delete "devices:" and insert -- devices; --.

In Column 37, In Line 24 (Approx.), In Claim 11, delete "re- construct" and insert -- re-construct --.

Signed and Sealed this
Sixteenth Day of September, 2025

Coke Morgan Stewart
*Acting Director of the United States Patent and Trademark Office*